US010911290B2

(12) United States Patent
Li et al.

(10) Patent No.: US 10,911,290 B2
(45) Date of Patent: Feb. 2, 2021

(54) SECURE AND EFFICIENT ORTHOGONAL FREQUENCY DIVISION MULTIPLEXING TRANSMISSION SYSTEM WITH DISGUISED JAMMING

(71) Applicant: Board of Trustees of Michigan State University, East Lansing, MI (US)

(72) Inventors: Tongtong Li, Okemos, MI (US); Jian Ren, Okemos, MI (US); Yuan Liang, Lansing, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 0 days.

(21) Appl. No.: 16/814,199

(22) Filed: Mar. 10, 2020

(65) Prior Publication Data

US 2020/0304359 A1    Sep. 24, 2020

Related U.S. Application Data

(60) Provisional application No. 62/817,287, filed on Mar. 12, 2019, provisional application No. 62/816,570, filed on Mar. 11, 2019.

(51) Int. Cl.
*H04L 27/26*      (2006.01)
*G06F 17/16*      (2006.01)
*G06F 17/14*      (2006.01)
*H04W 12/00*      (2009.01)

(52) U.S. Cl.
CPC ........ *H04L 27/2662* (2013.01); *G06F 17/142* (2013.01); *G06F 17/16* (2013.01); *H04L 27/2605* (2013.01); *H04W 12/0017* (2019.01)

(58) Field of Classification Search
CPC ............. H04L 27/2602; H04L 27/2607; H04L 27/2662; H04L 27/2605
USPC ................................ 375/219, 260, 295, 316
See application file for complete search history.

(56) References Cited

U.S. PATENT DOCUMENTS

| | | | | |
|---|---|---|---|---|
| 8,369,425 B2* | 2/2013 | Bai | ..................... | H04L 27/2613 375/260 |
| 2004/0082303 A1* | 4/2004 | Giannakis | ............. | H04L 1/0618 455/130 |
| 2010/0111224 A1* | 5/2010 | Lim | ...................... | H04L 1/0028 375/296 |
| 2012/0076089 A1* | 3/2012 | Kawamura | ........... | H04L 1/0073 370/329 |
| 2012/0250523 A1* | 10/2012 | Miki | ..................... | H04L 1/1861 370/242 |
| 2017/0339697 A1* | 11/2017 | Park | ...................... | H04L 5/0044 |
| 2018/0287682 A1* | 10/2018 | Kwak | .................. | H04L 5/0057 |
| 2019/0357193 A1* | 11/2019 | Bai | ...................... | H04W 72/10 |

* cited by examiner

*Primary Examiner* — Emmanuel Bayard
(74) *Attorney, Agent, or Firm* — Harness, Dickey & Pierce, PLC

(57) ABSTRACT

A securely pre-coded orthogonal frequency division multiplexing (SP-OFDM) system includes a transmitter configured to transmit a secure transmit signal through a dynamic constellation and a receiver configured to recover the original signal from the received secure transmit signal. It is aimed to reinforce the physical layer security of wireless communications under hostile interference. Potential applications include 4G and 5G communication systems, ASTC3.0 HDTV systems, WiFi systems, and any future wireless systems that utilize OFDM.

20 Claims, 11 Drawing Sheets

SECURE AND EFFICIENT ORTHOGONAL FREQUENCY DIVISION MULTIPLEXING TRANSMISSION SYSTEM WITH DISGUISED JAMMING

CROSS-REFERENCE

This application claims the benefit of U.S. Provisional Application 62/816,570, filed Mar. 11, 2019 and U.S. Provisional Application 62/817,287, filed Mar. 12, 2019. The entire disclosures of the above applications are incorporated herein by reference.

STATEMENT REGARDING FEDERALLY SPONSORED RESEARCH OR DEVELOPMENT

This invention was made with government support under CNS1217206 awarded by the National Science Foundation. The government has certain rights in the invention.

FIELD

The present disclosure relates to orthogonal frequency multiplexing transmission systems and more particularly to secure pre-coding and decoding of orthogonal frequency multiplexing transmission systems as an anti-jamming technique. Potentially, the technique described in this disclosure can be used to reinforce the physical layer security of 4G, 5G communication systems, ASTC3.0 HDTV systems, WiFi systems, and any future wireless systems that utilize OFDM.

BACKGROUND

In wireless systems, one of the most commonly used techniques for limiting the effectiveness of an opponent's communication is referred to as jamming, in which the authorized user's signal is deliberately interfered by the adversary. Along with the wide spread of various wireless devices, especially with the advent of user configurable intelligent devices, jamming attack is no longer limited to battlefield or military related events, but has become an urgent and serious threat to civilian communications as well.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

In accordance with the present invention, a securely pre-coded transceiver system includes a transmitter configured to transmit a secure transmit signal. The transmitter includes a secure pre-coding device configured to receive an input data stream and apply a pre-coded phase shift to each data in the input data stream to generate a shifted symbol vector. The transmitter includes an inverse fast Fourier transform device or a signal generation device configured to compute a transmit signal based on the shifted symbol vector and a secure cyclic prefix device configured to apply a phase shift to a first portion of a cyclic prefix of the transmit signal to generate the secure transmit signal.

The securely pre-coded transceiver system includes a receiver configured to receive the secure transmit signal. The receiver includes a synchronization device configured to estimate an offset of the received secure transmit signal to determine a shifted secure transmit signal. The receiver includes a fast Fourier transform device or a signal recovering device configured to recover a transformed symbol vector from the shifted secure transmit signal and a secure decoding device configured to obtain a symbol vector by applying a matrix to the transformed symbol vector.

In other features, the receiver recovers the input data stream from the obtained symbol vector by mapping the obtained symbol vector to an estimated version of the input data stream. In other features, the secure pre-coding device includes a sequence generator to generate the pre-coded phase shift to apply to each data in the input data stream. In other features, the pre-coded phase shift is random. In other features, the sequence generator is initialized using a global clock. In other features, the synchronization device is initialized using the global clock.

In other features, the secure pre-coding device includes an encryption device configured to encrypt the pre-coded phase shift. In other features, the secure pre-coding device includes a mapping device configured to receive the input data stream and map the input data stream to a symbol vector. In other features, the pre-coded phase shift is applied to the symbol vector to generate the shifted symbol vector. In other features, the signal generation device computes an inverse fast Fourier transform of the shifted symbol vector to generate the transmit signal.

In other features, the shifted symbol vector includes a plurality of data as subcarrier signals. In other features, the phase shift applied by the secure cyclic prefix device is encrypted. In other features, the synchronization device estimates the offset based on the first portion of the cyclic prefix of the received secure transmit signal and a second portion of the cyclic prefix of the received secure transmit signal.

In other features, the synchronization device shifts the received secure transmit signal based on the offset to determine the shifted secure transmit signal. In other features, the signal recovering device applies a fast Fourier transform to the secure transmit signal to recover the transformed symbol vector. In other features, the input data stream is transmitted using orthogonal frequency division multiplexing (SP-OFDM).

A securely pre-coded orthogonal frequency division multiplexing (SP-OFDM) method includes obtaining, for transmission, an input data stream, wherein the input data stream inputs a plurality of data and applying a pre-coded phase shift to each data included in the input data stream to generate a shifted symbol vector. The method includes computing a transmit signal as an inverse fast Fourier transform of the shifted symbol vector and applying a secure phase shift to a first portion of a cyclic prefix of the transmit signal to generate a secure transmit signal.

The method includes transmitting the secure transmit signal to a receiver. The receiver obtains the input data stream by receiving the secure transmit signal and estimating an offset to apply to the received secure transmit signal. The offset is based on the first portion of the cyclic prefix of the received secure transmit signal and a second portion of the cyclic prefix of the received secure transmit signal. The receiver shifts the received secure transmit signal based on the offset and recovers a transformed symbol vector by computing a fast Fourier transform of the shifted secure transmit signal. The receiver estimates the input data stream from a recovered symbol vector, wherein the recovered symbol vector is obtained by applying a matrix to the transformed symbol vector.

In other features, the method includes generating the pre-coded phase shift as a random phase shift to apply to each data in the input data stream. In other features, the pre-coded phase shift is generated using a global clock. In other features, the offset is estimated using the global clock. In other features, the method includes encrypting the pre-coded phase shift. In other features, the pre-coded phase shift is applied to each symbol included in a symbol vector. In other features, each symbol included in the symbol vector is mapped from a corresponding data of the input data stream. In other features, the secure phase shift is encrypted.

A securely pre-coded orthogonal frequency division multiplexing (SP-OFDM) system includes a transmitter configured to transmit a secure transmit signal. The transmitter includes a channel encoder configured to (i) receive an input data stream, (ii) add controlled redundancy, and (iii) generate a new data stream and a mapper configured to receive the data stream and map the data stream to a symbol vector. The transmitter includes a secure pre-coder configured to receive the symbol vector and apply a random phase shift to each symbol of the symbol vector and an inverse fast Fourier transform module configured to generate a body of an OFDM block using an inverse fast Fourier transform based on the shifted symbol vector.

The transmitter includes a secure cyclic prefix module configured to apply a phase shift to part of a cyclic prefix of the OFDM block to generate the secure transmit signal. The SP-OFDM system includes a receiver configured to receive the secure transmit signal. The receiver includes a synchronization module configured to estimate an offset based on the cyclic prefix and an OFDM body tail of the OFDM block and a demodulation module configured to remove the cyclic prefix by cropping the cyclic prefix to obtain the body of the OFDM block. The receiver includes a fast Fourier transform module configured to apply a fast Fourier transform to the secure transmit signal to obtain a transformed symbol vector and a secure decoding module configured to obtain the symbol vector by applying a matrix to the transformed symbol vector.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

DETAILED DESCRIPTION

Figure 1:
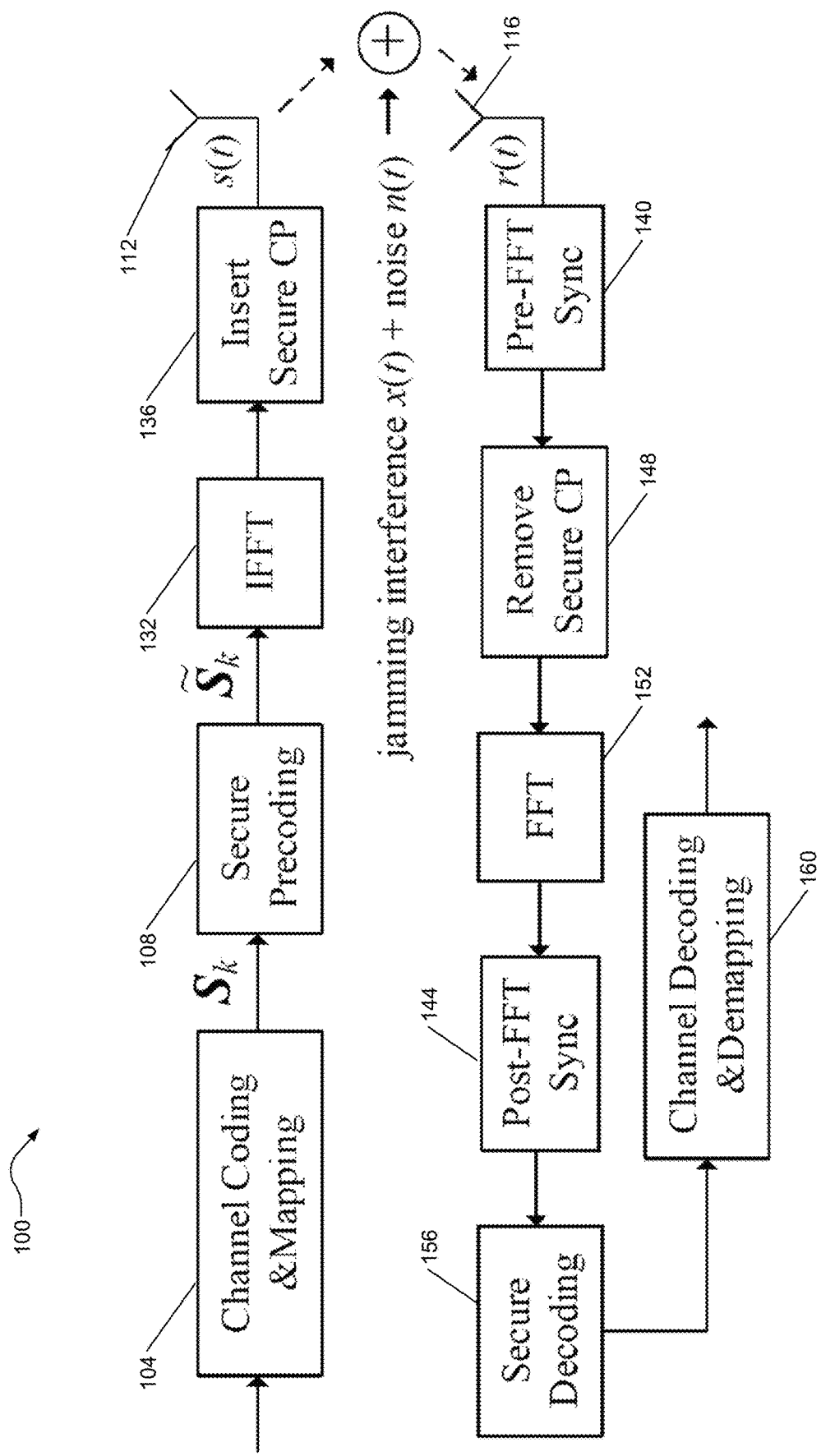
FIG. 1 is a functional block diagram of an exemplary implementation of an anti-jamming orthogonal frequency division multiplexing (OFDM) design through secure pre-coding and decoding.

A securely pre-coded orthogonal frequency division multiplexing (SP-OFDM) system for efficient and reliable transmission under disguised jamming, where the jammer intentionally misleads the receiver by mimicking the characteristics of the authorized signal, and causes complete communication failure is presented. More specifically, a dynamic constellation is brought off by introducing secure shared randomness between the legitimate transmitter and receiver, and hence break the symmetricity between the authorized signal and the disguised jamming. The channel capacities of both the traditional OFDM and SP-OFDM are analyzed under hostile jamming using the arbitrarily varying channel (AVC) model. Potentially, the technique described in this disclosure can be used to reinforce the physical layer security of 4G, 5G communication systems, ASTC3.0 HDTV systems, WiFi systems, and any future wireless systems that utilize OFDM.

The deterministic coding capacity of the traditional OFDM is shown as zero under the worst disguised jamming. On the other hand, due to the secure randomness shared between the authorized transmitter and receiver, SP-OFDM can achieve a positive capacity under disguised jamming since the AVC channel corresponding to SP-OFDM is not symmetrizable. A remarkable feature of the proposed SP-OFDM scheme is that, while achieving strong jamming resistance, it has roughly the same high spectral efficiency as the traditional OFDM system. The robustness of the proposed SP-OFDM scheme under disguised jamming is demonstrated through both theoretic and numerical analyses.

Previously, jamming has been modeled as Gaussian noise. Based on the noise jamming model and the Shannon capacity formula, $C=B\log(1+SNR)$, an intuitive impression is that jamming is harmful only when the jamming power is much higher than the signal power. However, this is only partially true. More recently, it has been found that disguised jamming, where the jamming is highly correlated with the signal, and has a power level close or equal to the signal power, can be much more destructive than the noise jamming; it can reduce the system capacity to zero even when the jamming power equals the signal power. In Equation 1, below:

$$R=S+J+N$$

S is the authorized signal, J is the jamming interference, N is the noise independent off and S, and R is the received signal. If the jammer is capable of eavesdropping on the symbol constellation and the codebook of the transmitter, it can simply replicate one of the sequences in the codebook of the legitimate transmitter. The receiver, then, would not be able to distinguish between the authorized sequence and the jamming sequence, resulting in a complete communication failure.

Due to the high spectral efficiency and robustness under fading channels, OFDM has been widely used in modern high-speed multimedia communication systems, such as LTE and WiMax. However, unlike the spread spectrum techniques, OFDM mainly relies on channel coding for communication reliability under hostile jamming and has very limited built-in resilience against jamming attacks. For example, the bit error rate (BER) performance of the traditional OFDM was explored under full-band and partial band Gaussian jamming, as well as multi-tone jamming. The OFDM was shown to be quite fragile under jamming, as BER can go above $10^{-1}$ when the jamming power is the same as the signal power.

The jamming attacks aiming at pilots in OFDM systems were studied. When the system standard is public and no encryption is applied to the transmitted symbol sequence, pilot attacks can completely nullify the channel estimation and synchronization of OFDM and result in complete communication failure. Previously, focus has been on jamming attacks that damage OFDM by minimizing the signal-to-interference power ratio (SIR). A main threat to OFDM from the disguised jamming is when the jamming interference is also OFDM modulated as the receiver can easily be deceived into synchronizing with the jamming interference instead of the legitimate signal, hence paralyzing the legitimate transmission.

In other aspects, the anti-jamming performance of a Frequency Hopped (FH) OFDM system was explored. Like the traditional FH system, this approach achieves jamming resistance through large frequency diversity and sacrifices the spectral efficiency of OFDM. A collision-free frequency hopping (CFFH) scheme is where the basic idea is to randomize the jamming interference through frequency domain interleaving based on secure, collision-free frequency hopping. The most significant feature of CFFH based OFDM is that it is very effective under partial band jamming, and at the same time, has the same spectral efficiency as the original OFDM. However, CFFH based OFDM is still fragile under disguised jamming.

To combat disguised jamming in OFDM systems, a pre-coding scheme has been proposed where extra redundancy is introduced to achieve jamming resistance. However, lack of plasticity in the pre-coding scheme results in inadequate reliability under cognitive disguised jamming. As OFDM is identified as a major modulation technique for the 5G systems, there is an increasing need on the development of secure and efficient OFDM systems that are reliable under hostile jamming, especially the destructive disguised jamming.

A main issue posed by disguised jamming is that there is the symmetricity between the authorized signal and the jamming interference. Intuitively, to design the corresponding anti-jamming system, the main task is to break the symmetricity between the authorized signal and the jamming interference or make it impossible for the jammer to achieve this symmetricity. For this purpose, encryption or channel coding at the bit level will not really help, since the symmetricity appears at the symbol level. That is, instead of using a fixed symbol constellation, secure randomness is introduced to the constellation, and utilizes a dynamic constellation scheme, such that the jammer can no longer mimic the authorized user's signal. At the same time, the authorized user does not have to sacrifice too much on the performance, efficiency, and system complexity.

By integrating advanced cryptographic techniques into OFDM transceiver design, in the proposed securely precoded OFDM (SP-OFDM) system, a dynamic constellation is designed by introducing shared randomness between the legitimate transmitter and receiver, which breaks the symmetricity between the authorized signal and the jamming interference, and hence ensures reliable performance under disguised jamming. A remarkable feature of the proposed SP-OFDM scheme is that it achieves strong jamming resistance but has almost the same high spectral efficiency as the traditional OFDM system. Moreover, the change to the physical layer transceivers is minimal, feasible, and affordable.

The securely pre-coded OFDM (SP-OFDM) is designed by exploiting secure symbol-level pre-coding basing on phase randomization. The basic idea is to randomize the phase of transmitted symbols using the secure PN sequences generated from the Advanced Encryption Standard (AES) algorithm. The security is guaranteed by the secret key shared only between the legitimate transmitter and receiver. While SP-OFDM achieves strong jamming resistance, it does not introduce too much extra coding redundancy into the system and can achieve roughly the same spectral efficiency as the traditional OFDM system.

In another aspect, the vulnerability of the synchronization algorithm in the original OFDM system under disguised jamming is identified. Therefore, a secure synchronization scheme for SP-OFDM is proposed that is robust against disguised jamming. In the proposed synchronization scheme, an encrypted cyclic prefix (CP) for SP-OFDM is implemented, and the synchronization algorithm utilizes the encrypted CP as well as the pre-coded pilot symbols to estimate time and frequency offsets in the presence of jamming.

In a further aspect, the channel capacity of the traditional OFDM and the proposed SP-OFDM under hostile jamming is analyzed using the arbitrarily varying channel (AVC) model. It is shown that the deterministic coding capacity of the traditional OFDM is zero under the worst disguised jamming. At the same time, it has been proven that with the secure randomness shared between the authorized transmitter and receiver, the AVC channel corresponding to SP-OFDM is not symmetrizable, and SP-OFDM can achieve a positive capacity under disguised jamming. Note that the authorized user aims to maximize the capacity while the jammer aims to minimize the capacity, it is shown that the maximum capacity for SP-OFDM under hostile jamming is given by $$C = \log\left(1 + \frac{P_S}{P_J + P_N}\right)$$

bit/symbol, where $P_S$ denotes the signal power, $P_J$ the jamming power and $P_N$ the noise power.

Numerical examples are provided to demonstrate the effectiveness of the proposed system under disguised jamming and channel fading. Potentially, SP-OFDM is a promising modulation scheme for high speed transmission under hostile environments. It can be used to reinforce the physical layer security of 4G, 5G communication systems, ASTC3.0 HDTV systems, WiFi systems, and any other wireless systems that utilize OFDM. Moreover, the secure pre-coding scheme presented can also be applied to modulation techniques other than OFDM.

High-Level Overview of Sp-ODFM

FIG. 1 is a functional block diagram of an example implementation of an anti-jamming OFDM design 100 through secure pre-coding and decoding. Let $N_c$ be the number of subcarriers in the OFDM system 100 and $\Phi$ the alphabet of transmitted symbols. For $i=0, 1, \ldots, N_c-1$ and $k \in \mathbb{Z}$, let $S_{k,i} \in \Phi$ denote the symbol transmitted on the i-th carrier of the k-th OFDM block. The symbol vector of the k-th OFDM block is denoted by $S_k = [S_{k,0}, S_{k,1}, \ldots, S_{k,N_c-1}]^T$. The input data stream is first fed to the channel encoder or a channel coding and mapping 104, mapped to the symbol vector $S_k$, and then fed to the proposed symbol-level secure pre-coder 108, shown in more detail in FIG. 2.

A key enabling factor for reliable communication under disguised jamming is to introduce shared randomness between a transmitter 112 and a receiver 116, such that the symmetry between the authorized signal and the jamming interference is broken. To maintain full spectral efficiency of the traditional OFDM system, the pre-coding is performed by multiplying an invertible $N_c \times N_c$ pre-coding matrix $P_k$ to the symbol vector $S_k$, i.e.:

$$\overline{S}_k = P_k S_k \quad (1)$$

The pre-coding matrix $P_k$ is designed to be a diagonal matrix as:

$$P_k = \mathrm{diag}(e^{-j\Theta_{k,0}}, e^{-j\Theta_{k,1}}, \ldots, e^{-j\Theta_{k,N_c-1}}) \quad (2)$$

Figure 2:
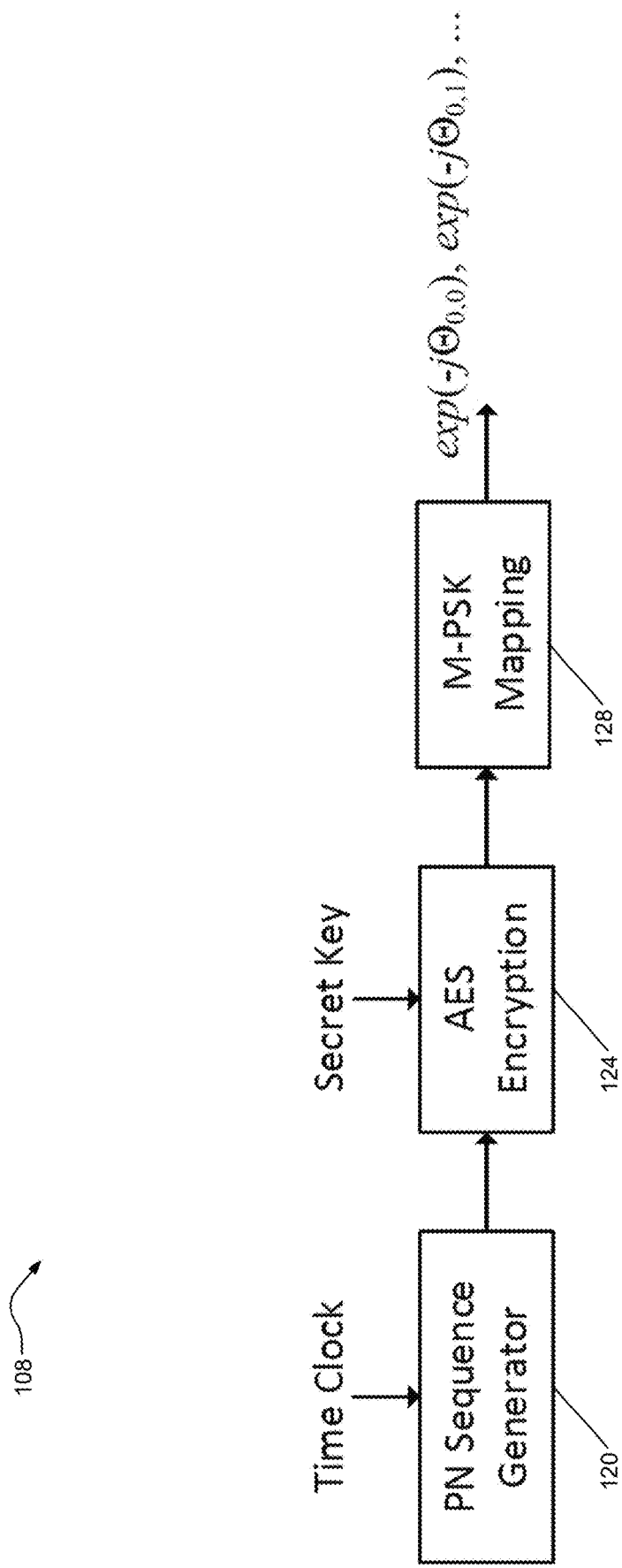
FIG. 2 is a functional block diagram of an exemplary implementation of secure pre-coding.

That is, a random phase shift is applied to each transmitted symbol; more specifically, for $i=0, 1, \ldots, N_c-1$ and $k \in \mathbb{Z}$, a random phase shift $-\Theta_{k,i}$ is applied to the symbol transmitted on the i-th carrier of the k-th OFDM block. The phase shift changes randomly and independently across sub-carriers and OFDM blocks and is encrypted so that the jammer has no access to it. More specifically, $\{\Theta_{k,i}\}$ is generated through a secure phase shift generator implemented as the secure pre-coding 108 step, as shown in FIG. 2. The secure phase shift generator consists of three parts: (i) a pseudo-noise (PN) sequence generator 120; (ii) an Advanced Encryption Standard (AES) encryption module 124; and (iii) an M-PSK mapper 128.

The PN sequence generator 120 generates a pseudo-random sequence, which is then encrypted with AES encryption module 124. The encrypted sequence is further converted to PSK symbols using the M-PSK mapper 128, where M is a power of 2, and every $\log_2 M$ bits are converted to a PSK symbol. To facilitate the synchronization process, the PN sequence generator 120 is initialized so that each party is equipped with a global time clock and the PN sequence generators are reinitialized at fixed intervals. The new state for re-initialization, for example, can be the elapsed time after a specific reference epoch in seconds for the time being, which is public. As the initial state changes with each re-initialization, no repeated PN sequence will be generated. The security, as well as the randomness of the generated phase shift sequence, are guaranteed by the AES encryption algorithm of the AES encryption module 124, for which the secret encryption key is only shared between the authorized transmitter and receiver. Hence, the phase shift sequence is random and inaccessible for the jammer. The resulted symbol vector from the secure pre-coding, $\overline{S}_k$, is then used to generate a body of the OFDM block through inverse fast Fourier transform (IFFT) 132, whose duration is $T_S$.

In OFDM transceiver design, the synchronization module plays a crucial role: OFDM requires both accurate time and frequency synchronization to avoid inter-symbol interference (ISI) and inter-carrier interference (ICI). In SP-OFDM, a cyclic prefix (CP) based synchronization algorithm is used, as in traditional OFDM. However, SP-OFDM differs in that its CP is encrypted to ensure the security under disguised jamming, shown as insert CP 136.

In traditional OFDM, CP has three major functions: (i) eliminating the ISI between neighboring blocks; (ii) converting the linear convolution of the OFDM block body with the channel impulse response into circular convolution under multi-path channel fading; and (iii) eliminating the ICI introduced by multipath propagation. As CP is a copy of a tail of the OFDM block body, the correlation between CP and the tail of the OFDM block is calculated to estimate the starting point of each OFDM block when disguised jamming is absent.

Figure 3:
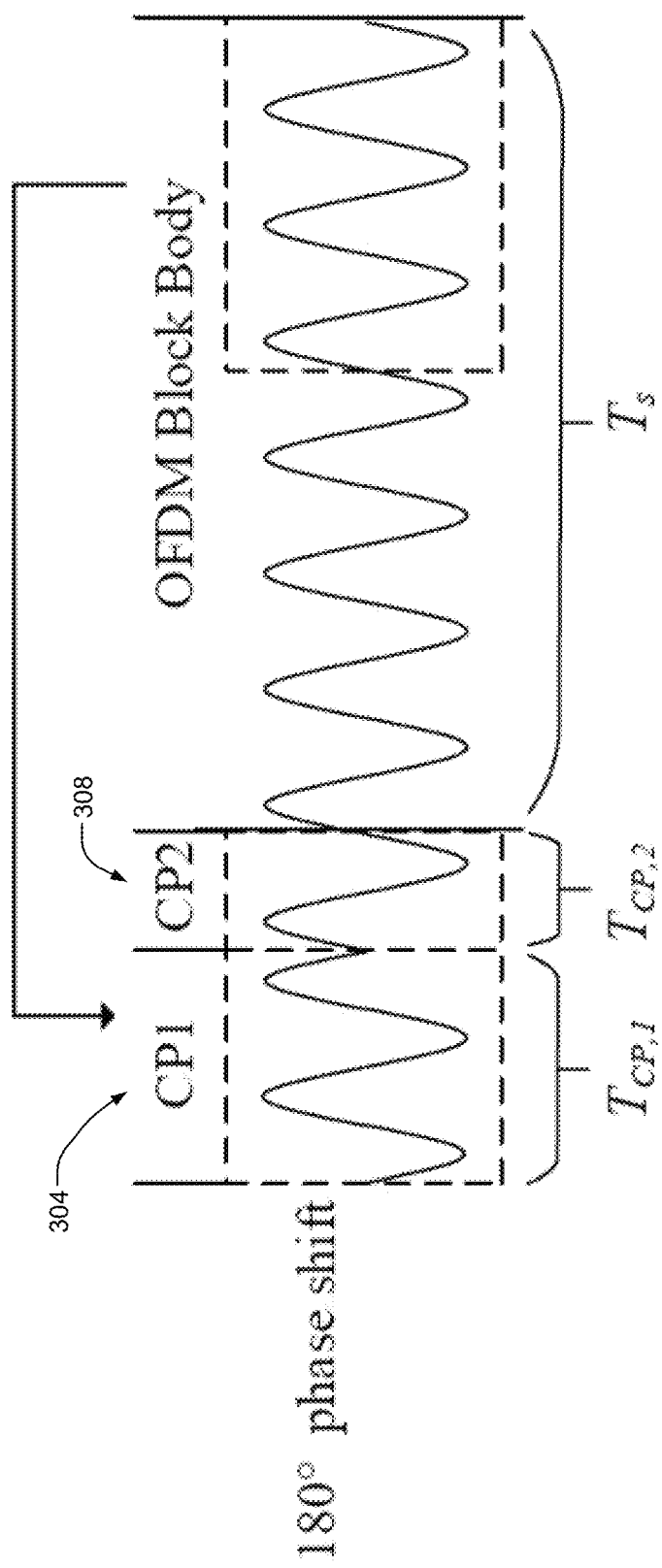
FIG. 3 is a graphical depiction of an exemplary OFDM waveform with secure cyclic prefix, illustrated with a 180 degree phase shift on CP1.

However, the traditional CP based synchronization is fragile under disguised jamming. FIG. 3 is a graphical depiction of an exemplary OFDM waveform with a secure CP, illustrated with a 180 degree phase shift on CP1. To ensure the robustness of synchronization, in SP-OFDM, a secure phase shift is applied to part of the CP for each OFDM block. More specifically, the CP of each OFDM block is divided into two parts. For a first part, CP1 304, with a duration of $T_{CP,1}$, a secure phase shift is applied to the signal. For a second part, CP2 308, which is of length $T_{CP,2}$, no special processing is applied. CP1 304 is used for effective synchronization under disguised jamming, and CP2 308 maintains the functions of the original CP. To avoid ISI and ICI, both $T_{CP,1}$ and $T_{CP,2}$ are chosen to be longer than the maximum delay spread of the channel.

To ensure the security, the phase shift applied to CP1 is encrypted and varies for each OFDM block. The corresponding secure phase shift sequence can be generated using the same phase shift generator proposed in FIG. 2, with a much lower generation rate, since only one phase shift symbol is needed per OFDM block. Let $s_k(t)$ denote the signal of the k-th OFDM block in the time domain by aligning the beginning of the OFDM block body at $t=0$, and $C_k$ denote the phase shift symbol applied to its CP1; let $u(t)$ be the unit step function, $T_{CP} = T_{CP,1} + T_{CP,2}$ and $T_S$ denote the duration of the OFDM block body. Define function $u_k(t)$ as:

$$u_k(t) \triangleq C_k[u(t+T_{CP}) - u(t+T_{CP,2})] + u(t+T_{CP,2}) - u(t-T_S). \quad (3)$$

Figure 4:
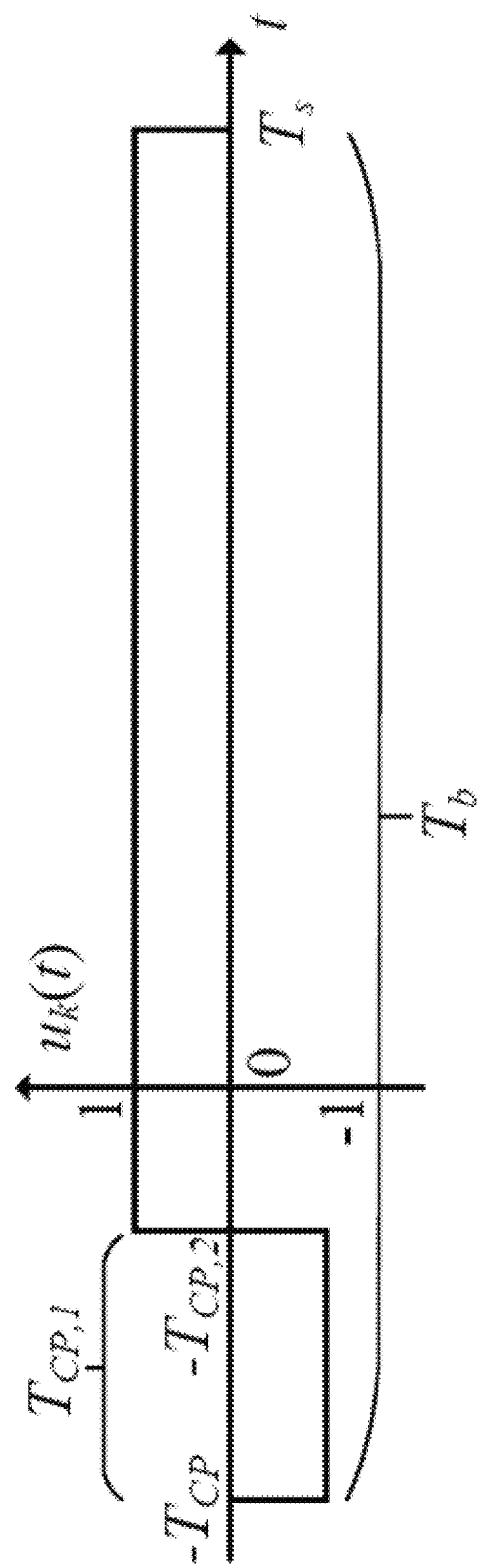
FIG. 4 is a graphical depiction showing a waveform.

An example of $u_k(t)$ with $C_k = -1$ is plotted in FIG. 4. For SP-OFDM with secure CP, $s_k(t)$ can be expressed as:

$$s_k(t) = \frac{1}{N_c} \sum_{i=0}^{N_c-1} \tilde{S}_{k,i} e^{j\frac{2\pi i}{T_S}t} u_k(t), \quad (4)$$

where $\overline{S}_{k,i} = S_{k,i} e^{-j\Theta_{k,i}}$. Let $T_b = T_S + T_{CP}$ denote the duration of an OFDM block. Then the entire OFDM signal in the time domain can be expressed as:

$$s(t) = \sum_{k=-\infty}^{\infty} s_k(T - kT_b). \quad (5)$$

Even though the receiver can generate identical phase shift sequences used in CP1 generation from the design of FIG. 2, there will still be an offset between the two generated sequences considering the delays in communication and the mismatch between the time clocks. Let $C_k$ and $\overline{C}_k$ denote the phase shift symbols generated at the transmitter 112 and receiver 116 respectively, resulting in:

$$C_k = \tilde{C}_{k+k_0} \forall k. \quad (6)$$

Since the phase shift sequences are generated from the global time clock, the offset $k_0$ is bounded. The offset $k_0$ can be estimated by the synchronization module at the receiver. Note that synchronization is needed for the pre-coding matrix sequence $P_k$ as well; for the ease of synchronization, the CP phase shift symbol $C_k$ is paired with the pre-coding matrix $P_k$ for each OFDM block k; that is, for each CP phase shift symbol generated, $N_C$ phase shift symbols are generated in parallel as the sub-carrier phase shifts. In this way, the two phase shift sequences are synchronized, in the sense that once the synchronization on the CP phase shift sequence is obtained, the synchronization on the pre-coding matrices is achieved automatically.

With respect to the receiver 116 design, an additive white Gaussian noise (AWGN) channel under hostile jamming may be implemented. The transmitted OFDM signal is subject to an AWGN term, denoted by n(t), and an additive jamming interference x(t). The received OFDM signal can be expressed as $$r(t) = s(t-t_0) e^{j(\omega_0 t + \phi_0)} + x(t) + n(t), \quad (7)$$

where $t_0$, $\omega_0$, and $\phi_0$ denote the time, frequency, and phase offsets between the transmitter 112 and receiver 116, respectively. Without loss of generality, it is assumed that $t_0 \in [0, T_b)$.

As in the traditional OFDM system, the synchronization module of SP-OFDM consists of two stages. First, a pre-FFT synchronization 140, which makes use of the correlation between the secure CP and the OFDM body tail to roughly estimate the offsets. Second, a post-FFT synchronization 144, which makes use of the pilot symbols inserted to certain sub-carriers to obtain a fine estimation. The phase shift offset $k_0$ is also estimated in the pre-FFT synchronization 140 stage.

A demodulation module at the receiver 116 will remove the secure CP 148 by cropping the CP to obtain the body of each OFDM block, and apply FFT 152 to obtain the frequency component at each sub-carrier. Under perfect synchronization, the received signal of the k-th OFDM block body can be expressed as:

$$r_k(t) = s_k(t) + x_k(t) + n_k(t), t \in [0, T_S), \quad (8)$$

where $x_k(t)$ and $n_k(t)$ are the jamming interference and noise overlaid on the k-th OFDM block, respectively. The frequency components of jamming and noise can be calculated as:

$$J_{k,i} = \sum_{m=0}^{N_c-1} x_k\left(\frac{mT_s}{N_c}\right) e^{-j\frac{2\pi i}{N_c}m}, i = 0, 1, \ldots, N_c - 1, \quad (9)$$

$$\overline{N}_{k,i} = \sum_{m=0}^{N_c-1} n_k\left(\frac{mT_s}{N_c}\right) e^{-j\frac{2\pi i}{N_c}m}, i = 0, 1, \ldots, N_c - 1, \quad (10)$$

where $$\frac{T_s}{N_c}$$

is the sampling interval. For an AWGN channel, $\overline{N}_{k,i}$'s of Equation (10) are independent and identically distributed circularly symmetric complex Gaussian random variables with variance $a\sigma^2$. After applying FFT to the received signal, a symbol vector $\tilde{R}_k = [\tilde{R}_{k,0}, \tilde{R}_{k,1}, \ldots, \tilde{R}_{k,N_c-1}]^T$ is obtained for the k-th transmitted OFDM block. That is:

$$\tilde{R}_k = P_k S_k + J_k + \tilde{N}_k, \quad (11)$$

where $$J_k = [J_{k,0}, J_{k,1}, \ldots, J_{k,N_c-1}]^T, \quad (12)$$

and $$\overline{N}_k = [\overline{N}_{k,0}, \overline{N}_{k,1}, \ldots, \overline{N}_{k,N_c-1}]^T. \quad (13)$$

A secure decoding module 156 multiplies the inverse matrix of $P_k$ to $\tilde{R}_k$, which results in the symbol vector:

$$R_k = S_k + P_k^{-1} J_k + P_k^{-1} \overline{N}_k, \quad (14)$$

where $R_k = [R_{k,0}, R_{k,1}, \ldots, R_{k,N_c-1}]^T$ with $$R_{k,i} = S_{k,i} + e^{j\Theta_{k,i}} J_{k,i} + N_{k,i}, \quad (15)$$

where $N_{k,i} = e^{j\Theta_{k,i}} \overline{N}_{k,i}$, and $\Theta_{k,i}$ is uniformly distributed over $$\left\{\frac{2\pi i}{M} \,\Big|\, i = 0, 1, \ldots, M-1\right\}.$$

Note that for any circularly symmetric Gaussian random variable $N, e^{j\Theta}N$, and N have the same distribution for any angle $\theta$. That is, $N_{k,i}$ is still a circular symmetric complex Gaussian random variable of zero-mean and variance $\sigma^2$. Taking the delay in the communication system into consideration, the authorized user and the jammer are assumed to lack knowledge regarding the sequence of each other. After the signal is securely decoded by the secure decoding module 156, the signal is further decoded and demapped 160.

As mentioned previously, considerable vulnerability exists during the synchronization process in traditional OFDM under disguised jamming attacks. However, as discussed below, a proposed synchronization algorithm of SP-OFDM may be effective under hostile jamming. In modern OFDM systems, there are generally two kinds of approaches to achieve signal synchronization: (i) making use of the correlation between the CP and the tail of each OFDM block, or (ii) inserting certain training symbols in every OFDM frame. However, neither of these two approaches is robust under malicious jamming, especially disguised jamming, where the jammer modulates the inference with OFDM and deceives the receiver into synchronizing with the disguised jamming instead of the legitimate signal. For the training sequence based synchronization approach, even if the training sequence is not public, there is still a chance for the jammer to eavesdrop on the training sequence and then generate the OFDM modulated disguised jamming with the true training sequence.

Figure 5:
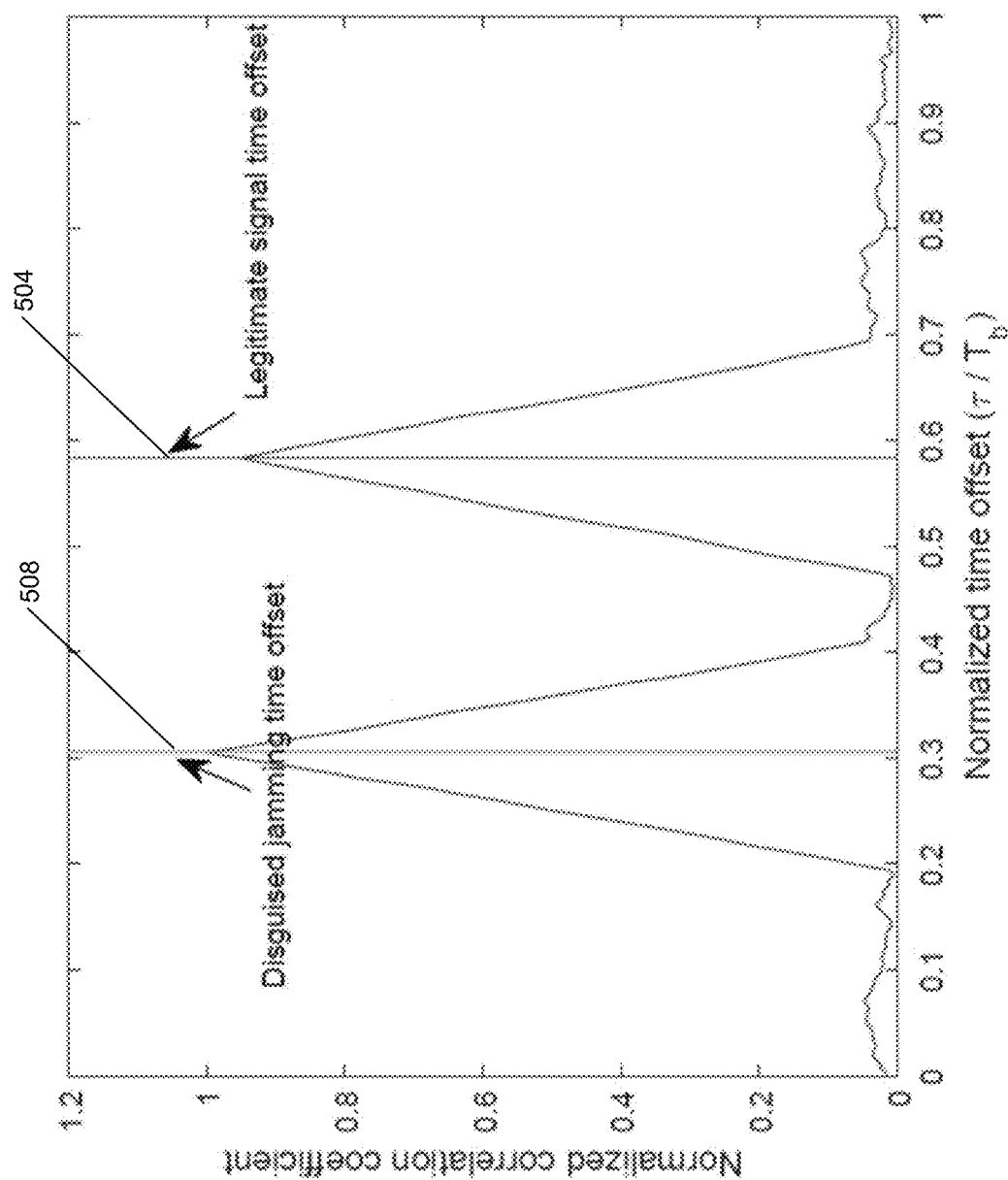
FIG. 5 is a graphical depiction showing correlation coefficients of the original OFDM under disguised jamming.

To demonstrate the damage of disguised jamming, the CP based correlation coefficients of the traditional OFDM signal are calculated at different time offsets in the AWGN channel under an OFDM modulated disguised jamming. The correlation coefficients are averaged over multiple OFDM blocks, and the result is shown in FIG. 5. Without proper encryption applied to the signal, the legitimate signal and the jamming interference are completely symmetric. Peaks of the correlation coefficients exist at two different time offsets, one corresponding to that of the legitimate signal 504 and the other corresponding to that of the disguised jamming 508. If the jamming power is the same as the signal power, then the probability that the receiver chooses to synchronize with jamming is 50%. Obviously, a complete communication failure occurs when the receiver chooses to synchronize with the disguised jamming 508 instead of the legitimate signal 504.

To address this problem, in the synchronization algorithm of SP-OFDM, encrypted phase shifts are applied to the sub-carriers and CP. For the ease of analysis, an AWGN channel model is considered. The effectiveness of the proposed algorithm in multi-path fading channels has been verified through numerical analysis, discussed in further detail below. Even though a goal is to guarantee the robustness of SP-OFDM under disguised jamming, in the following analysis, any specific form on the jamming interference x(t) is not assumed. Therefore, the robustness of the following algorithm under any form of jamming attacks is proven. Without loss of generality, the combined term of jamming and noise is denoted as z(t)=x(t)+n(t), and the received signal can be expressed as $$r(t) = s(t-t_0)e^{j(\omega_0 t + \phi_0)} + z(t), \quad (16)$$

In the pre-FFT synchronization 140 stage, the encrypted phase shift sequence offset $k_0$, time offset $t_0$, and the fractional part of $\omega_0 T_S/2\pi$ are estimated for frequency offset $\omega_0$. Since the phase shift sequence $C_k$ is generated from the global time clock, the receiver has rough bounds on $k_0$ relative to the arrival time of the signal. The finite candidate set of offset $k_0$ is denoted by $\mathcal{K}$.

In the traditional OFDM system, the CP correlation based synchronization algorithm is derived from the maximum-likelihood (ML) rule. However, since the jamming distribution is presently unspecified, the ML rule is not applicable. Instead, the robustness of the synchronization algorithm of SP-OFDM is proved using the Chebychev inequality.

In the pre-FFT stage synchronization 140, the receiver 116 calculates the following correlation coefficient $$Y_k(\tau, d) \triangleq \int_{\tau-T_{CP}+kT_b}^{\tau-T_{CP,2}+kT_b} r(t)r*(t+T_s)\tilde{C}_{k+d}^* dt, k \in \mathbb{Z}^* \quad (17)$$

for $\tau \in [0, T_b)$, $d \in \mathcal{K}$. The following proposition on $Y_k(\tau,d)$, whose proof is given in the Appendix.

Proposition 1: If the fourth moment of z(t) is bounded for any time instant t, i.e., $\mathbb{E}\{|z(t)|^4\} < \infty, \forall t \in \mathbb{R}$, then as $K \to +\infty$:

$$\frac{1}{K}\sum_{k=0}^{K-1} Y_k(\tau, d) = \begin{cases} \frac{P_S}{N_c}v(\tau + T_b - t_0)e^{-j\omega_0 T_S}, & d = k_0 - 1, \\ \frac{P_S}{N_c}v(\tau - t_0)e^{-j\omega_0 T_S}, & d = k_0, \\ \frac{P_S}{N_c}v(\tau - T_b - t_0)e^{-j\omega_0 T_S}, & d = k_0 + 1, \\ 0, & \text{otherwise,} \end{cases} \quad (18)$$

almost surely, where $$v(\tau) \triangleq \begin{cases} \tau + T_{CP,1}, & -T_{CP,1} \leq \tau < 0, \\ T_{CP,1} - \tau, & 0 \leq \tau < T_{CP,1}, \\ 0 & \text{otherwise,} \end{cases} \quad (19)$$

and $P_S$ is the average symbol power of constellation $\Phi$.

Basing on Proposition 1, to estimate $t_0$ and $k_0$, $\tau$ and d are searched for, which can maximize $$\left|\frac{1}{K}\sum_{k=0}^{K-1} Y_k(\tau, d)\right|$$

for some K. Meanwhile, after $t_0$ and $k_0$ are obtained, the phase of the average correlation coefficient $$\frac{1}{K}\sum_{k=0}^{K-1} Y_k(t_0, k_0) \text{ is:} \quad (20)$$

$$-w_0 T_s \bmod 2\pi,$$

where the fractional part of $\omega_0 T_S/2\pi$ can be estimated as well. In practice, the jamming interference should be peak power bounded considering the constraints in RF, so it is ensured that the fourth moment of z(t) is bounded. The selection of K depends on the power and the form of the jamming interference. Under a disguised jamming, SP-OFDM is shown as able to obtain relatively accurate estimation results with 25 to 30 OFDM blocks.

As in the traditional OFDM, the CP based synchronization is only able to provide a coarse estimation of time offset $t_0$, especially under multi-path fading, and it requires a fine estimation on the time offset at the post-FFT synchronization 144 stage. In addition, from Equation (21), it can be seen that even for a very minor estimation error on the carrier frequency, there still may be an essential phase offset. As long as the range of the time estimation error is smaller than the duration of CP2, without loss of generality, the signal can be modeled after pre-FFT synchronization 140 as:

$$r'(t) = s(t - t'_0)e^{j\left(\frac{2\pi(n_0+\zeta_0)}{T_s}t+\phi_0\right)} + z'(t), \quad (21)$$

where z'(t) is the jamming interference after pre-FFT synchronization 140, $t'_0 \in [0, T_{CP,2})$ is the remaining time offset, $2\pi(n_0+\zeta_0)/T_S$ is the remaining frequency offset, $n_0$ is an integer and $|\zeta_0| \ll 1$.

During the post-FFT synchronization 144 stage, $n_0+\zeta_0$ is estimated after demodulating the synchronized signal r'(t) in Equation (21) using FFT. Suppose $n_0$ satisfies $$N_l \leq n_0 \leq N_u, \quad (22)$$

where integers $N_l$ and $N_u$ are determined by the maximal frequency offset between the transmitter and receiver. Basing on Equation (21), to demodulate the k-th OFDM block, the receiver applies FFT to signal r'(t) within interval $[kT_b, kT_b+T_S]$. The received signal of the k-th OFDM block after alignment can be expressed as:

$$r'_k(t) = s_k(t - t'_0)e^{j\left(\frac{2\pi(n_0+\zeta_0)}{T_s}t+\phi_k\right)} + z'_k(t), t \in [0, T_s), \quad (23)$$

where $$\phi_k = \phi_0 + \frac{2\pi(n_0+\zeta_0)T_b}{T_s}k, \quad (24)$$

and $$z'_k(t) = z'(t + kT_b). \quad (25)$$

Considering the frequency offset $n_0$, the receiver samples the received signal with a sampling frequency $$\frac{N_c + N_u - N_l}{T_s}. \text{ Let } N'_c \triangleq N_c + N_u - N_l.$$

For $0 \leq i < N'_c$, the FFT applied to $r'_k(t)$ can be expressed as:

$$R_k(i) = \sum_{m=0}^{N'_c-1} r'_k\left(\frac{mT_s}{N'_c}\right) e^{-j\frac{2\pi i}{N'_c}m} = \frac{e^{j\phi_k}}{N_c} \sum_{i'=0}^{N'_c-1} \tilde{S}_{k,i'} \frac{e^{-j\frac{2\pi t'_0}{T_s}i'}(1-e^{j2\pi\zeta_0})}{1-e^{-j\frac{2\pi(n_0+\zeta_0+i'-i)}{N'_c}}} + Z'_k(i), \quad (26)$$

where $$Z'_k(i) = \sum_{m=0}^{N'_c-1} z'_k\left(\frac{mT_s}{N'_c}\right) e^{-j\frac{2\pi i}{N'_c}m}. \quad (27)$$

Since it is assumed that $|\zeta_0| \ll 1$, $0 \leq i < N'_c$, the inter carrier interference can be neglected in (26) and approximate $R_k(i)$ as:

$$R_k(i) = \frac{N'_c}{N_c} e^{j\phi_k} e^{-j\frac{2\pi t'_0}{T_s}[(i-n_0) \bmod N'_c]} \tilde{S}'_{k,i-n_0} + Z'_k(i), \quad (28)$$

where $$\tilde{S}'_{k,i} \begin{cases} \tilde{S}_{k,(i \bmod N'_c)}, & 0 \leq i \bmod N'_c < N_c, \\ 0, & \text{otherwise.} \end{cases} \quad (29)$$

The post-FFT synchronization 144 generally utilizes the pilot symbols inserted at certain sub-carriers. For the ease of analysis, it is assumed that a pilot symbol p is placed at sub-carrier $i_p$ of each OFDM block. Note that, as the pre-coding matrix sequence is synchronized with the CP phase shift sequence, the pre-coding matrix sequence is synchronized at the receiver after pre-FFT synchronization. The following correlation coefficients for each OFDM block k are calculated:

$$\Gamma_k(i) \triangleq R_k(i) R^*_{k+1}(i) e^{j(\Theta_{k,i_p} - \Theta_{k+1,i_p})}. \quad (30)$$

Proposition 2: If the fourth moment of $z(t)$ is bounded for any time t, then as $K \to +\infty$:

$$\frac{1}{K}\sum_{k=0}^{K-1} \Gamma_k(i) = \begin{cases} \left(\frac{N'_c}{N_c}\right)^2 e^{j\frac{2\pi(n_0+\zeta_0)T_b}{T_s}} |p|^2, & i = n_0 + i_p \bmod N'_c, \\ 0 & \text{otherwise,} \end{cases} \quad a.s. \quad (31)$$

Note that $\Gamma_k(i)$ can be derived as:

$$\Gamma_k(i) = \left[\left(\frac{N'_c}{N_c}\right)^2 e^{j\frac{2\pi(n_0+\zeta_0)T_b}{T_s}} \tilde{S}'_{k,i-n_0} \tilde{S}'^*_{k+1,i-n_0} + \frac{N'_c}{N_c} e^{j\phi_k} \tilde{S}'_{k,i-n_0} Z'^*_{k+1}(i) + \quad (32)$$

-continued $$\frac{N'_c}{N_c} e^{j\phi_{k+1}} \tilde{S}'^*_{k+1,i-n_0} Z'_k(i) + Z'_k(i) Z'^*_{k+1}(i) \bigg] e^{j(\Theta_{k,i_p} - \Theta_{k+1,i_p})}.$$

Since the phase shifts $\Theta_{k,i}$'s are independent across the sub-carriers, following the approach in the pre-FFT analysis:

$$\mathbb{E}\{\Gamma_k(i)\} = \begin{cases} \left(\frac{N'_c}{N_c}\right)^2 e^{j\frac{2\pi(n_0+\zeta_0)T_b}{T_s}} |p|^2, & i = n_0 + i_p \bmod N'_c, \\ 0 & \text{otherwise,} \end{cases} \quad (33)$$

while the variance of $$\frac{1}{K}\sum_{k=0}^{K-1} \Gamma_k(i)$$

converges to 0 as $K \to +\infty$. Therefore, Equation (31) is obtained.

Following Proposition 2, $n_0$ can be estimated by finding the i which maximizes $$\frac{1}{K}\sum_{k=0}^{K-1} \Gamma_k(i).$$

With the $n_0$ obtained, the frequenecy estimation error $\zeta_0$ in the pre-FFT stage can be further estimated by evaluating the phase of $$\frac{1}{K}\sum_{k=0}^{K-1} \Gamma_k((n_0 + i_p) \bmod N'_c).$$

After $n_0$ is estimated, without loss of generality, it can be assumed that $n_0=0$ in the following derivation. In terms of the time offset $t'_0$, given two pilot symbols $p_1$ and $p_2$ located at sub-carriers $i_{p1}$ and $i_{p2}$, respectively, the following correlation coefficient for each OFDM block k is evaluated:

$$\gamma_k(i_{p1}, i_{p2}) = R_k(i_{p1}) R^*_k(i_{p2}) p^*_1 p_2 e^{j(\Theta_{k,ip1} - \Theta_{k+1,ip2})} \quad (34)$$

Proposition 3: If the fourth moment of $z(t)$ is bounded for any time t, then as $K \to +\infty$:

$$\frac{1}{K}\sum_{k=0}^{K-1} \gamma_k(i_{p1}, i_{p2}) = \left(\frac{N'_c}{N_c}\right)^2 e^{-j\frac{2\pi t'_0}{T_s}(i_{p1}-i_{p2})} |p_1|^2 |p_2|^2, \quad a.s. \quad (35)$$

The proof of Proposition 3 follows a similar approach as Proposition 1. Note that $t'_0 \in [0, T_{CP,2})$, so $t'_0$ can be estimated from the phase of $$\frac{1}{K}\sum_{k=0}^{K-1} \gamma_k(i_{p1} + i_{p2}).$$

Likewise, the phase offset $\phi_0$ can be estimated by averaging $$R_k(i_p) e^{j\Theta_{k,ip}}.$$

after compensating for the frequency offset.

Under disguised jamming, the estimator averages multiple OFDM blocks to make use of the encrypted signal for an accurate synchronization. In practice, estimation errors always exist in synchronization, so the receiver has to keep track of all the offsets, which can be implemented by the moving average approach.

The pre-FFT synchronization exploits the correlation between secure CP and the OFDM body tail. The data-aided synchronization approach, i.e., inserting independent training sequences in each OFDM frame, is still an option under disguised jamming if encryption is applied to the training sequence. However, the CP based approach experiences less delay in synchronization. By inserting secure CP for each OFDM block, it is easier to keep track of the time offset continuously.

In the post-FFT stage, inserting more pilots can accelerate the synchronization process; meanwhile, under fading channels, the channel estimation process necessitates pilot symbols over different sub-carrier locations. Channel estimation can be implemented by averaging the received pilot symbols at each sub-carrier location following the approach in synchronization. However, an important point here is that, for time varying channels, the duration of the OFDM blocks used for averaging should be smaller than the coherence time so that the channel does not change significantly during each estimation. This is guaranteed in practical systems where the whole OFDM frame duration is shorter than the channel coherence time.

Symmetricity and Capacity Analysis

The symmetricity and capacity of the proposed SP-OFDM system are analyzed using the arbitrarily varying channel (AVC) model. As discussed above, under perfect synchronization, the equivalent channel model of SP-OFDM can be expressed as:

$$R = S + e^{j\Theta} J + N, \quad (36)$$

where $S \in \Phi$, $J \in \mathbb{C}$, $N \sim \mathcal{CN}(0, \sigma^2 I)$, $\Theta$ is uniformly distributed over $$\left\{ \frac{2\pi i}{M} \mid i = 0, 1, \ldots, M-1 \right\},$$

and $\mathcal{CN}(\mu, \Sigma)$ denotes a circularly symmetric complex Gaussian distribution with mean $\mu$ and variance $\Sigma$. For generality, in this section, it is not assumed that any a priori information on the jamming J, except a finite average power constraint of $P_J$, i.e., $\mathbb{E}\{|J|^2\} \leq P_J$. The AVC corresponding to SP-OFDM is then shown as non-symmetrizable, and hence the AVC capacity of SP-OFDM is positive under disguised jamming.

The arbitrarily varying channel (AVC) model characterizes the communication channels with unknown states which may vary in arbitrary manners across time. For the jamming channel in Equation (36) of interest, the jamming symbol J can be viewed as the state of the channel under consideration. The channel capacity of AVC evaluates the data rate of the channel under the most adverse jamming interference among all the possibilities. Note that unlike the jamming free model where the channel noise sequence is independent of the authorized signal and is independent and identically distributed, the AVC model considers the possible correlation between the authorized signal and the jamming, as well as the possible temporal correlation among the jamming symbols, which may cause worse damage to the communication.

To prove the effectiveness of the proposed SP-OFDM under disguised jamming, some basic concepts and properties of the AVC model are used. Definition 1 of the symmetrizable AVC channel is as follows: let $W(r|s,x)$ denote the conditional PDF of the received signal R given the transmitted symbol $s \in \Phi$ and the jamming symbol $x \in \mathbb{C}$. The AVC channel of Equation (36) is symmetrizable if and only if for some auxiliary channel $\pi: \Phi \to \mathbb{C}$, $\forall s, s' \in \Phi$, $r \in \mathbb{C}$:

$$\int_{\mathbb{C}} W(r|s,x) dF_\pi(x|s') = \int_{\mathbb{C}} W(r|s',x) dF_\pi(x|s), \quad (37)$$

where $F_\pi(\cdot|\cdot)$ is the probability measure of the output of channel $\pi$ given the input, i.e., the conditional cumulative distribution function (CDF):

$$F_\pi(x|s) = Pr\{\text{Re}(\pi(s)) \leq \text{Re}(x), \text{Im}(\pi(s)) \leq \text{Im}(x)\}, \quad (38)$$

for $x \in \mathbb{C}$, $s \in \Phi$, where $\pi(s)$ denotes the output of channel $\pi$ given input symbol s.

The set of all the auxiliary channels, $\pi$'s, that can symmetrize channel of Equation (36) by $\Pi$, that is:

$$\Pi = \{\pi | \text{Eq.}(37) \text{ is satisfied } w.r.t. \pi, \forall s,s' \in \Phi, r \in \mathbb{C}\}. \quad (39)$$

With the average jamming power constraint being considered, a definition of 1-symmetrizable channel is also introduced. Definition 2: the AVC channel of Equation (36) is called 1-symmetrizable under average jamming power constraint if and only if there exists a $\pi \in \Pi$ such that:

$$\int_{\mathbb{C}} |x|^2 dF_\pi(x|s) < \infty, \forall s \in \Phi. \quad (40)$$

It has been shown that reliable communication can be achieved as long as the AVC channel is not 1-symmetrizable. Lemma 1: the deterministic coding capacity of the AVC channel of Equation (36) is positive under any hostile jamming with finite average power constraint if and only if the AVC is not 1-symmetrizable. The deterministic coding capacity is defined by the capacity that can be achieved by a communication system, when it applies only one code pattern during the information transmission. In other words, the coding scheme is deterministic and can be readily repeated by other users. Furthermore, given a specific average jamming power constraint $P_J$, the channel capacity C in this case equals:

$$C = \max_{\mathcal{P}_S} \min_{F_J} I(S, R), \quad (41)$$

$$\text{s.t.} \int_{\mathbb{C}} |x|^2 dF_J(x) \leq P_J,$$

where $I(S, R)$ denotes the mutual information (MI) between the R and S in Equation (36), $\mathcal{P}_S$ denotes the probability distribution of S over $\Phi$ and $F_J(\cdot)$ the CDF of J. First, it is shown that the traditional OFDM system is 1-symmetrizable under disguised jamming.

Theorem 1: the traditional OFDM system is 1-symmetrizable. Therefore, the deterministic coding capacity is zero under the worst disguised jamming with finite average jamming power.

Proof: the AVC model of the traditional OFDM system is $$R = S + J + N. \quad (42)$$

When S and J have the same constellation $\Phi$, hence the same finite average power, the AVC channel is 1-symmetrizable. It follows from Equation (42) that:

$$W(r|s,s') = W(r|s',s), \forall s, \in \Phi, r \in \mathbb{C}. \quad (43)$$

Since $\Phi$ has finite average power, the average power constraint of Equation (40) is satisfied by disguised jamming. Hence, the channel of Equation (42) is l-symmetrizable. From Lemma 1, a necessary condition for a positive AVC deterministic coding capacity is that the channel is not l-symmetrizable. So the traditional OFDM system has zero deterministic coding capacity under disguised jamming with finite average jamming power. Next, it is shown that that with the proposed secure pre-coding 108 of FIG. 1, it is impossible to l-symmetrize the AVC channel Equation (36) corresponding to the SP-OFDM system.

Theorem 2: the AVC channel corresponding to the proposed SP-OFDM is not l-symmetrizable. Proof: this result is proven by contradiction. Suppose that there exists a channel $\pi \in \Pi$ such that the AVC channel is l-symmetrizable. Denote the output of channel $\pi$ given input x by $\pi(x)$, and define the corresponding AVC channel output for inputs s and s' as $$\hat{R}(s,s') = s + \pi(s')e^{j\Theta} + N, \quad (44)$$

where $\hat{R}(s, s')$ denotes the channel output. Following Equation (37), $\hat{R}(s,s')$ and $\hat{R}(s,s')$ have the same distribution. Let $\varphi_X(\omega_1,\omega_2)$ denote the characteristic function (CF) of a complex random variable X:

$$\varphi_{\hat{R}(s,s')}(\omega_1,\omega_2) = \varphi_{\hat{R}(s,s')}(\omega_1,\omega_2), \quad (45)$$

and $$\varphi_{\hat{R}(s,s')}(\omega_1,\omega_2) = \varphi_{[s+\pi(s')e^{j\Theta}]}(\omega_1,\omega_2)\varphi_N(\omega_1,\omega_2), \quad (46)$$

where, for the complex Gaussian noise N:

$$\varphi_N(\omega_1,\omega_2) = e^{-\frac{\sigma^2}{4}(w_1^2+w_2^2)}, \quad \omega_1, \omega_2 \in (-\infty,+\infty), \quad (47)$$

which is non-zero over $\mathbb{R}^2$. Thus, by eliminating the characteristic functions of the Gaussian noises on both sides of Equation (45):

$$\varphi_{[s+\pi(s')e^{j\Theta}]}(\omega_1,\omega_2) = \varphi_{[s+\pi(s)e^{j\Theta}]}(\omega_1,\omega_2). \quad (48)$$

for $\omega_1, \omega_2 \in (-\infty, +\infty)$.

Let $s = s_1 + js_2$, to express $\varphi_{[s+\pi(s')e^{j\Theta}]}(\omega_1, \omega_2)$ as $$\varphi_{[s+\pi(s')e^{j\Theta}]}(\omega_1, \omega_2) = e^{js_1\omega_1 + js_2\omega_2}\varphi_{[\pi(s')e^{j\Theta}]}(\omega_1, \omega_2), \quad (49)$$

and $$\varphi_{[\pi(s')e^{j\Theta}]}(\omega_1, \omega_2) = \mathbb{E}\{e^{j\omega_1 \text{Re}(\pi(s')e^{j\Theta}) + j\omega_2 \text{Im}(\pi(s')e^{j\Theta})}\} \quad (50)$$

$$= \int_\mathbb{C} \mathbb{E}\{e^{j\omega_1 \text{Re}(xe^{j\Theta}) + j\omega_2 \text{Im}(xe^{j\Theta})}\} dF_\pi(x \mid s').$$

Under the proposed secure pre-coding scheme, $\Theta$ is uniformly distributed over $$\left\{\frac{2\pi i}{M} \mid i = 0, 1, \ldots, M-1\right\},$$

M is a power of 2:

$$\mathbb{E}\{e^{j\omega_1 \text{Re}(xe^{j\Theta}) + j\omega_2 \text{Im}(xe^{j\Theta})}\} = \quad (51)$$

$$\frac{1}{M}\sum_{i=0}^{M-1} e^{j\omega_1|x|\cos\left(\frac{2\pi i}{M}+\arg(x)\right)+j\omega_2|x|\sin\left(\frac{2\pi i}{M}+\arg(x)\right)} =$$

$$\frac{2}{M}\sum_{i=0}^{M/2-1} \cos\left\{\omega_1|x|\cos\left[\frac{2\pi i}{M}+\arg(x)\right] + \omega_2|x|\sin\left[\frac{2\pi i}{M}+\arg(x)\right]\right\}$$

which is of real value for $\omega_1, \omega_2 \in (-\infty, +\infty)$. So $\varphi_{[s+\pi(s')e^{j\Theta}]}(\omega_1, \omega_2)$ and $\varphi_{[s+\pi(s)e^{j\Theta}]}(\omega_1, \omega_2)$ are also real-valued over $\mathbb{R}^2$. For $s \neq s'$ and $s' = s_1' + js_2'$, $e^{j[(s_1-s_1')\omega_1+(s_2-s_2')\omega_2]}$ has non-zero imaginary part for $(s_1-s_1')\omega_1+(s_2-s_2')\omega_2 \neq n\pi$, $n \in \mathbb{Z}$. Without loss of generality, it is assumed that $s \neq s'$. From Equations (48), (49), and (51), for $$\omega_1 + \frac{s_2-s_2'}{s_1-s_1'}\omega_2 \neq \frac{n\pi}{s_1-s_1'}, \forall n \in \mathbb{Z}: \quad (52)$$

$$\varphi_{[\pi(s)e^{j\Theta}]}(\omega_1, \omega_2) = 0.$$

On the other hand, the characteristic function of an RV should be uniformly continuous in the real domain. So for any fixed $$\omega_2 \in (-\infty, \infty): \varphi_{[\pi(s)e^{j\Theta}]}\left(\frac{n\pi-(s_2-s_2')\omega_2}{s_1-s_1'}, \omega_2\right) = \quad (53)$$

$$\lim_{\omega_1 \to \frac{n\pi-(s_2-s_2')\omega_2}{s_1-s_1'}} \varphi_{[\pi(s)e^{j\Theta}]}(\omega_1, \omega_2), \forall n \in \mathbb{Z}.$$

$$\text{For } \omega_1 \in \left(\frac{(n-1)\pi-(s_2-s_2')\omega_2}{s_1-s_1'}, \frac{n\pi-(s_2-s_2')\omega_2}{s_1-s_1'}\right) \cup \quad (54)$$

$$\left(\frac{n\pi-(s_2-s_2')\omega_2}{s_1-s_1'}, \frac{(n+1)\pi-(s_2-s_2')\omega_2}{s_1-s_1'}\right), \varphi_{[\pi(s)e^{j\Theta}]}(\omega_1, \omega_2) \equiv 0,$$

$$\text{so } \varphi_{[\pi(s)e^{j\Theta}]}\left(\frac{n\pi-(s_2-s_2')\omega_2}{s_1-s_1'}, \omega_2\right) = 0, \forall n \in \mathbb{Z}.$$

Combining Equations (52) and (54) results in:

$$\varphi_{[\pi(s)e^{j\Theta}]}(\omega_1,\omega_2)=0, \forall \omega_1,\omega_2 \in (-\infty,\infty). \quad (55)$$

However, Equation (55) cannot be a valid characteristic function for any RV. Therefore, the auxiliary channel n does not exist, and H is empty. Hence, the AVC channel is not l-symmerizable.

Following Lemma 1, the result in Theorem 2 implies that the proposed SP-OFDM will always have positive capacity under any hostile jamming with finite average power constraint. Next, how to calculate the channel capacity of SP-OFDM under hostile jamming is described.

From Lemma 1, the capacity of channel $R = S + e^{j\Theta}J + N$ is given by:

$$C = \max_{\mathcal{P}_S} \min_{F_J} I(S, R),$$

$$\text{s.t.} \int_\mathbb{C} |x|^2 dF_J(x) \leq P_J.$$

It is difficult to obtain a closed form solution of the channel capacity for a general discrete transmission alphabet $\Phi$. However, if the distribution of the transmitted symbol S is relaxed from the discrete set $\Phi$ to the entire complex plane $\mathbb{C}$, under an average power constraint, the following result on channel capacity is obtained.

Theorem 3: the deterministic coding capacity of SP-OFDM is positive under any hostile jamming. More specifically, let the alphabet $\Phi = \mathbb{C}$, and the average power of S being upper bounded by $P_S$, then the maximum channel capacity in Equation (41) under average jamming power constraint $P_J$ and noise power $P_N = \sigma^{-2}$ is given by:

$$C = \log\left(1 + \frac{P_S}{P_J + P_N}\right). \tag{56}$$

The capacity is achieved at input distribution $\mathcal{CN}$ $(0, P_S)$ and jamming distribution $\mathcal{CN}$ $(0, P_J)$.

Lemma 2: mutual information $I(S, R)$ is concave with respect to the input distribution $F_S(\cdot)$ and convex with respect to the jamming distribution $F_J(\cdot)$.

Proof of Theorem 3: first, following Lemma 1 and Theorem 2, it is shown that the deterministic coding capacity of SP-OFDM is positive under any hostile jamming.

Second, the channel capacity of SP-OFDM is evaluated under hostile jamming. When the support of S is $\Phi = \mathbb{C}$, the whole complex plane, following Lemma 1, the channel capacity in Equation (41) equals:

$$C = \max_{\mathcal{P}_S} \min_{F_J} I(S, R), \tag{57}$$

$$\text{s.t.} \int_{\mathbb{C}} |x|^2 dF_S(x) \leq P_S, \tag{58}$$

$$\int_{\mathbb{C}} |x|^2 dF_J(x) \leq P_J, \tag{59}$$

where $F_S(\cdot)$ denotes the CDF function of S defined on $\mathbb{C}$, and Equations (58) and (59) denote the average power constraints on the input and the jamming, respectively.

The $I(S, R)$ is denoted with respect to the input distribution $F_S(\cdot)$ and the jamming distribution $F_J(\cdot)$ by $\phi(F_S, F_J)$. Following Lemma 2, $\phi(F_S, F_J)$ is concave with respect to $F_S(\cdot)$ and convex with respect to $F_J(\cdot)$. As long as the input distribution $F_S^*$ and the jamming distribution $F_J^*$ is found such that:

$$\phi(F_S, F_J^*) \geq \phi(F_S^*, F_J^*) \leq \phi(F_S^*, F_J), \tag{60}$$

for any $F_S$ and $F_J$ satisfying the average power constraints of Equations (58) and (59), respectively, then:

$$\phi(F_S^*, F_J^*) = C. \tag{61}$$

That is, the pair $(F_S^*, F_J^*)$ is the saddle point of the max-min problem in Equation (57).

Assume the jamming interference is circularly symmetric complex Gaussian with average power $P_J$, that is, $F_J^* = \mathcal{CN}$ $(0, P_J)$. Note that the phase shift would not change the distribution of a complex Gaussian RV, and the fact that the jamming J and the noise N are independent, hence the jammed channel in this case is equivalent to a complex AWGN channel with noise power $P_J + P_N$, where the capacity achieving input distribution is also a complex Gaussian with power $P_S$, that is, $F_S^* = \mathcal{CN}$ $(0, P_S)$. It follows that for any input distribution $F_S$ satisfying the power constraint $P_S$:

$$\phi(F_S, \mathcal{CN}(0, P_J)) \leq \phi(\mathcal{CN}(0, P_S), \mathcal{CN}(0, P_J)). \tag{62}$$

On the other hand, when the input distribution is $F_S^* = \mathcal{CN}$ $(0, P_S)$, the worst noise in terms of capacity for Gaussian input is Gaussian. Since $e^{j\Theta}J + N$ is complex Gaussian with power $P_J + P_N$ if $F_J^* = \mathcal{CN}$ $(0, P_J)$, then for any jamming distribution $F_J$ satisfying the power constraint $P_J$:

$$\pi(\mathcal{CN}(0, P_S), \mathcal{CN}(0, P_J)) \leq \phi(\mathcal{CN}(0, P_S), F_J). \tag{63}$$

So the saddle point $(F_S^*, F_J^*)$ is achieved at $(\mathcal{CN}(0, P_S), \mathcal{CN}(0, P_J))$, where the corresponding channel capacity is:

$$C = \log\left(1 + \frac{P_S}{P_J + P_N}\right), \tag{64}$$

completing the proof.

Performances of Synchronication and Bit Error Rate

Performances of the synchronization and bit error rate (BER) of the proposed SP-OFDM system under disguised jamming attacks are evaluated through numerical examples. For example, the situations described below are where the malicious user generates disguised jamming using OFDM, with the same format and power level as that of a legitimate signal. A first example involves synchronization performance under disguised jamming in AWGN channels to verify the robustness of SP-OFDM under disguised jamming in terms of synchronization for AWGN channels.

Table I, below, depicts SP-OFDM parameters in numerical results ($T_S$: duration of OFDM body):

| | |
|---|---|
| Carrier number $N_c$ | 128 |
| Number of candidate phase shift offset $|\mathcal{K}|$ | 50 |
| CP1 duration $T_{CP,1}$ | $T_s/8$ |
| Signal-to-noise radio (dB) | 15 |
| CP2 duration $T_{CP,2}$ | $T_s/16$ |
| Phase shift constellation size M | 16 |

Figure 6:
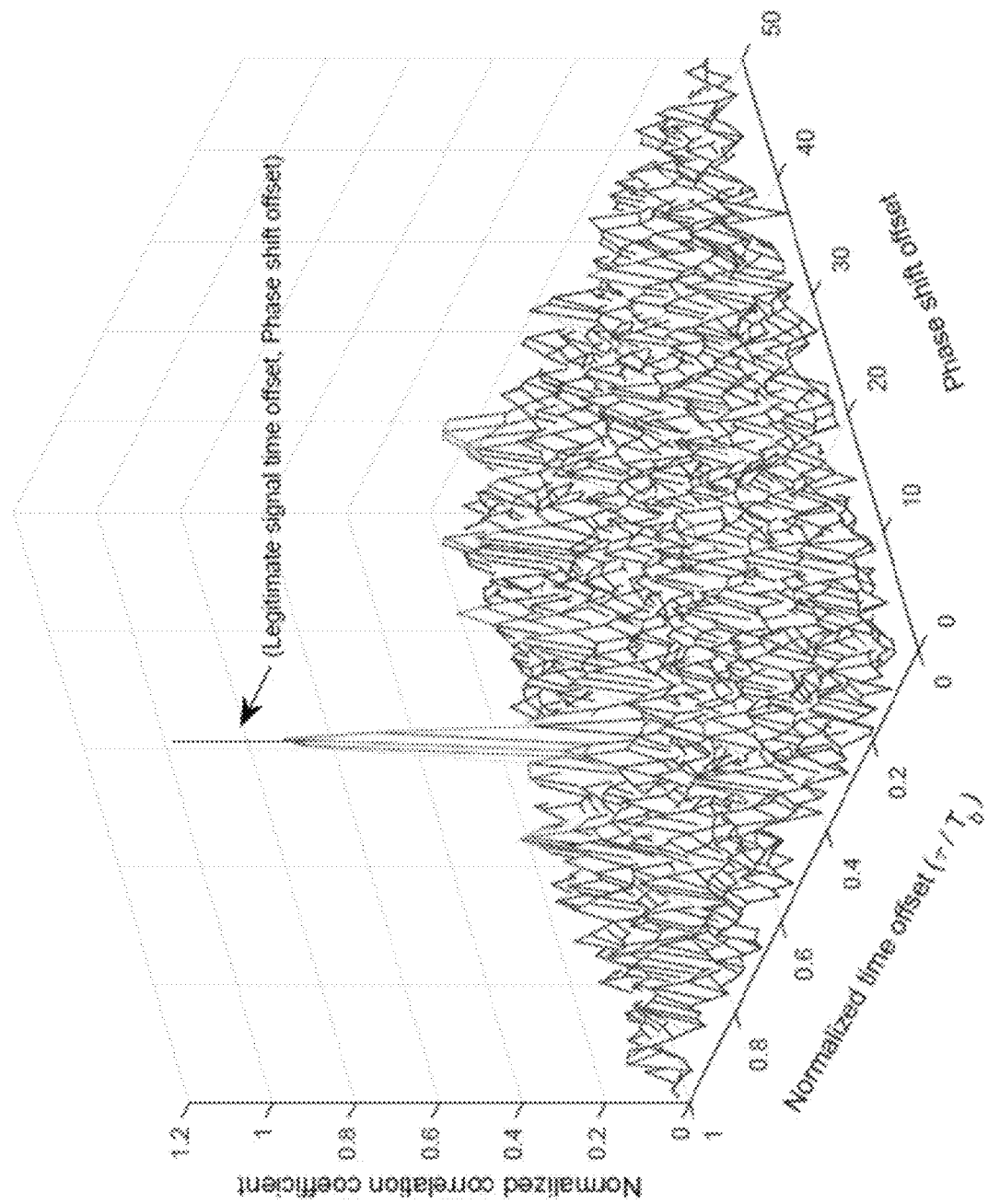
FIG. 6 is a graphical depiction showing correlation coefficients of securely pre-coded orthogonal frequency division multiplexing (SP-OFDM) at different time and phase shift sequence offsets under disguised jamming.

The average correlation coefficients are computed at different time offsets and phase shift sequence offsets for the received signal as in Equation (17), and the result is plotted in FIG. 6 for $K=40^3$. That is, FIG. 6 is a graphical depiction of correlation coefficients of SP-OFDM at different time and phase shift sequence offsets under disguised jamming.

Figure 7A:
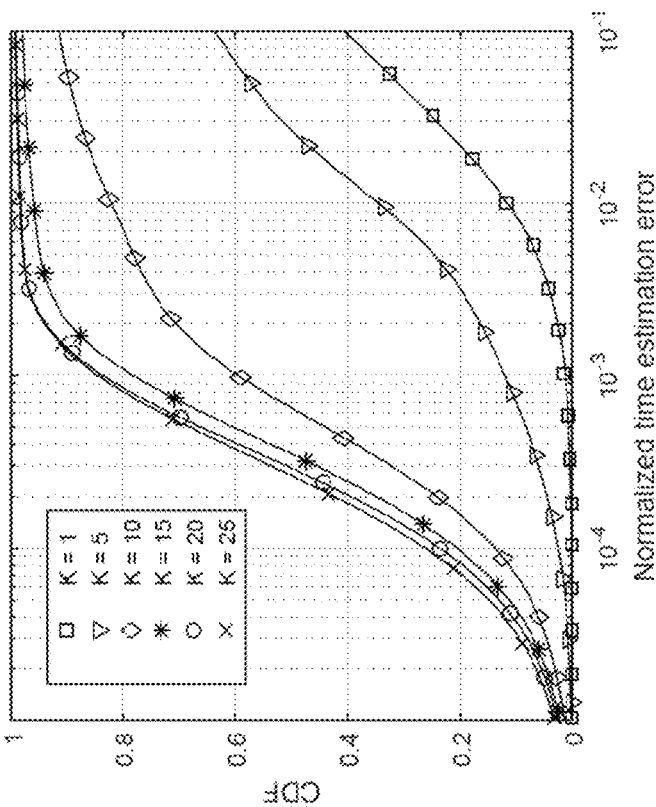
FIGS. 7A-7B are graphical depictions showing the synchronization error distribution under AWGN channels with disguised jamming attack.
Figure 7B:
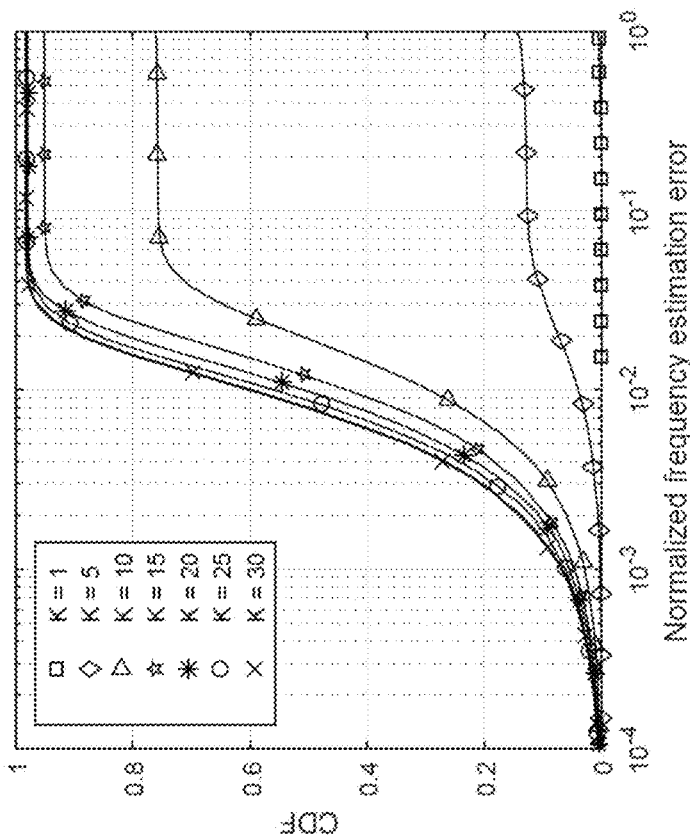

In FIG. 6, K denotes the number of OFDM blocks used for estimation. It shows that, with the secure pre-coding scheme, even under disguised jamming, the receiver is able to correctly estimate the time offset as well as the phase shift sequence offset of the legitimate signal. Then, the synchronization accuracy of SP-OFDM is simulated by calculating the CDFs of the estimation errors with different numbers of OFDM blocks K to average the correlation coefficients. The time offset is normalized by the duration of one OFDM block $T_b$ and the frequency offset by the sub-carrier spacing $1/T_S$. FIGS. 7A and 7B are graphical depictions of the synchronization error distribution under AWGN channels with disguised jamming attack. Specifically, FIG. 7A shows the normalized estimation error and FIG. 7B shows the normalized frequency estimation error. It can be observed that, under the given setup, with 25 OFDM blocks to compute the correlation coefficients, the synchronization algorithm is robust under disguised jamming, where 99% of cases have less than 0.01 normalized time offset estimation errors and 98% of cases have less than 0.4 normalized frequency offset estimation errors.

Figure 8B:
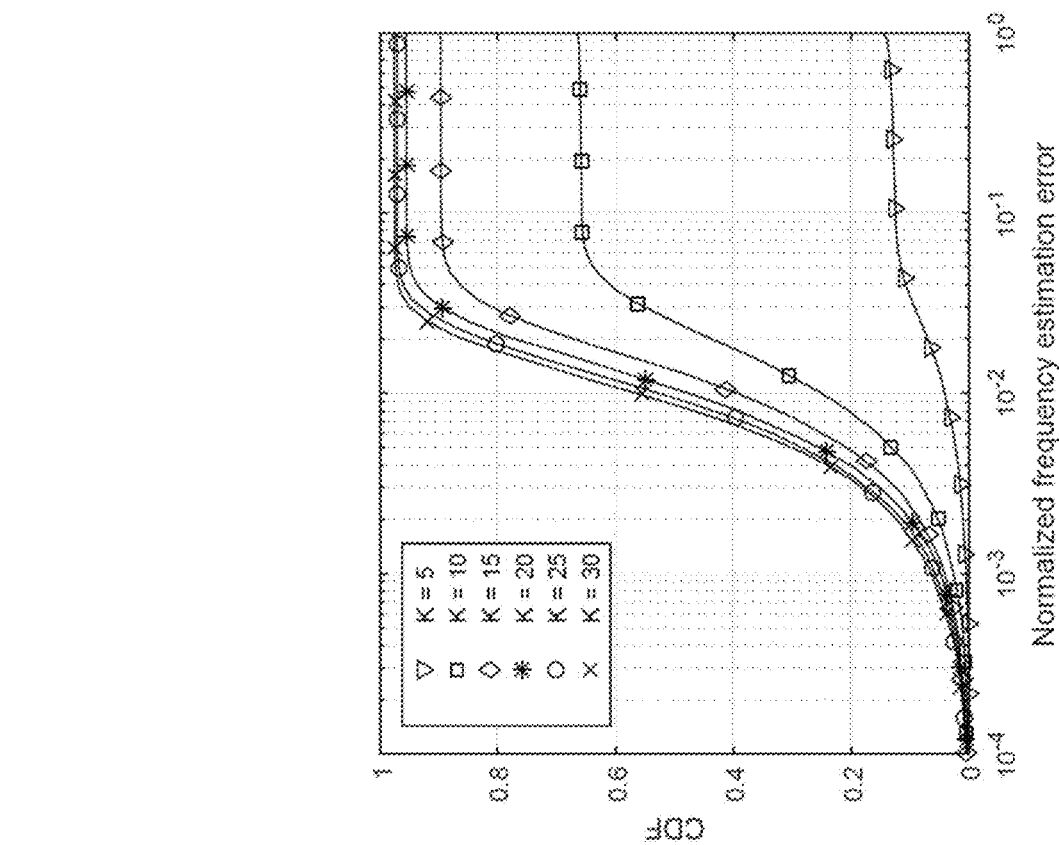
FIGS. 8A-8B are graphical depictions showing the synchronization error distribution under static multi-path fading channels with disguised jamming attack.
Figure 8A:
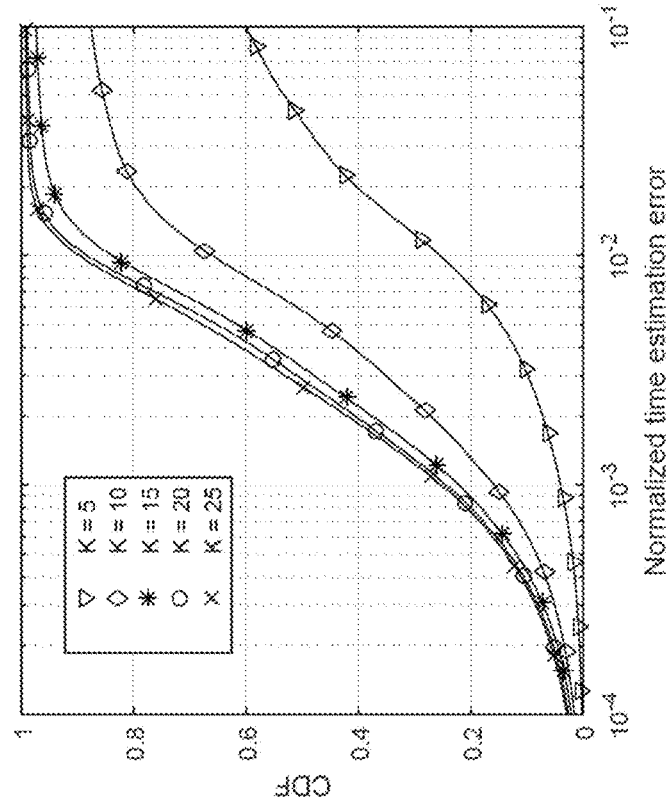

In a second example, synchronization performance under disguised jamming in multi-path fading channels is described. In the second example, the synchronization accuracy of SP-OFDM is simulated under disguised jamming in static and time varying multi-path fading channels, which are modeled as 4 paths fading channels with a maximum delay spread of $3T_s/256$. FIGS. 8A and 8B are graphical depictions showing the synchronization error distribution under static multi-path fading channels with disguised jamming attack. Specifically, FIG. 8A is a graphical depiction of the estimation error distribution in the static channel, showing the normalized time estimation error, while FIG. 8B shows the normalized frequency estimation error.

A slight performance loss is observed compared with the AWGN case, where 98% of cases have less than 0.2 normalized time offset estimation errors and 96.5% of cases have less than 0.4 normalized frequency offset estimation errors using 25 OFDM blocks in estimation. To demonstrate the effectiveness of the synchronization algorithm under slow time varying channels, a Doppler shift is introduced to each path with a maximum value of 2% sub-carrier spacing ($0.2/T_S$) in the multi-path fading channel.

Figure 9B:
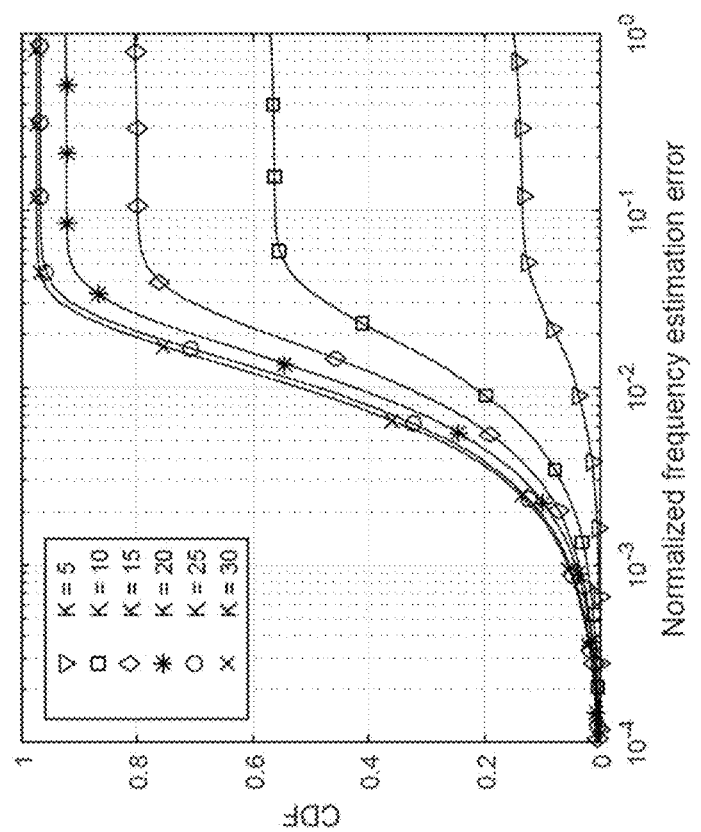
FIGS. 9A-9B are graphical depictions showing the synchronization error distribution under time varying multi-path fading channels with disguised jamming attack.
Figure 9A:
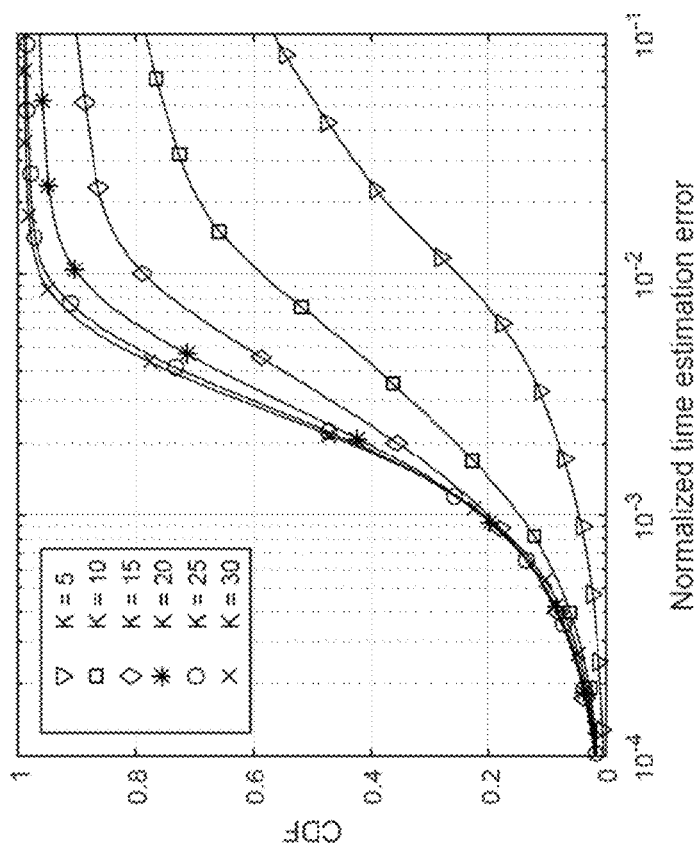

Now referring to FIGS. 9A and 9B, a graphical depiction of the synchronization error distribution under time varying multi-path fading channels with a disguised jamming attack is shown. FIG. 9A is a graph showing the normalized time estimation error and FIG. 9B is a graph showing the normalized frequency estimation error. The depicted estimation error distribution is under the time-varying multi-path fading channel, where around 98% of cases have less than 0.2 normalized time offset estimation errors and 96.5% of cases have less than 0.4 normalized frequency offset estimation errors using 30 OFDM blocks in estimation. The simulation results illustrate the robustness of SP-OFDM against disguised jamming attacks under various channel conditions.

In a third example, BER performance under disguised jamming in AWGN channels is shown. In the third example, the BER of the proposed system under disguised jamming in AWGN channels is analyzed. Perfect synchronization is assumed. The low density parity check (LDPC) codes are used for channel coding and adopt the parity check matrices from the DVB-S.2 standard. The coded bits are mapped into QPSK symbols. The random phase shifts in the proposed secure pre-coding are approximated as independent and identically distributed continuous RVs uniformly distributed over [0, 2π).

It is observed that such an approximation has a negligible difference on BER performance compared with a sufficiently large M. The jammer randomly selects one of the code words in the LDPC codebook and sends it to the receiver after the mapping and modulation. On the receiver side, a soft decoder is used for the LDPC codes, where the belief propagation (BP) algorithm is employed. The likelihood information in the BP algorithm is calculated using the likelihood function of a general Gaussian channel, where the noise power is set to $1+\sigma^2$ considering the existence of the disguised jamming, and $\sigma^2$ is the noise power. That is, the signal to jamming power ratio (SJR) is set to be 0 dB. It should be noted that for more complicated jamming distributions or mapping schemes, customized likelihood functions basing on the jamming distribution will be needed for the optimal performance.

Figure 10:
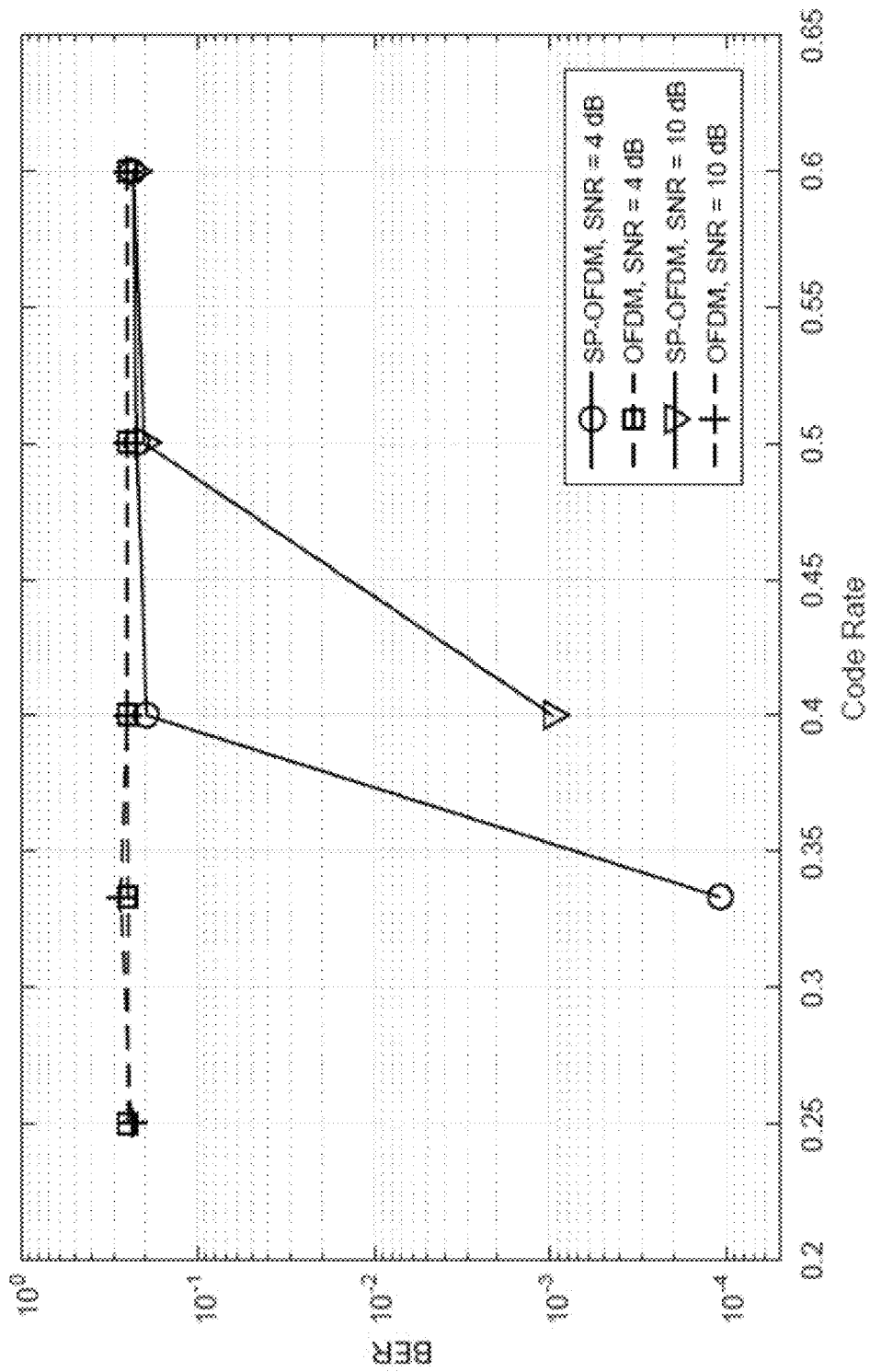
FIG. 10 is a graphical depiction showing BER performance comparison under disguised jamming in AWGN channels.

In FIG. 10, BER performance comparison under disguised jamming in AWGN channels is shown. The SP-OFDM versus the traditional OFDM system, signal to jamming power ratio (SJR)=0 dB. FIG. 10 compares the BERs of the communication system studied with and without the proposed secure pre-coding under different code rates and SNRs. It can be observed that: (i) under the disguised jamming, in the traditional OFDM system, the BER cannot really be reduced by decreasing the code rate or the noise power, which indicates that without appropriate anti-jamming procedures, the traditional OFDM cannot achieve reliable communications under disguised jamming and that (ii) with the proposed SP-OFDM scheme, when the code rates are below certain thresholds, the BER can be significantly reduced with the decrease of code rates using the proposed secure pre-coding. This demonstrates that the proposed SP-OFDM system can achieve a positive deterministic channel coding capacity under disguised jamming.

In a fourth example, BER performance under disguised jamming in Rician channels is described and shown. In the fourth example, the effectiveness of the proposed system in fading channels is verified. A Rician channel is considered where the multipath interference is introduced and a strong line of sight (LOS) signal exists. The fading effect is slow enough so that the channel remains unchanged for one OFDM symbol duration. In the simulation, the power of the direct path of the Rician channel is set to 1 and vary the $K_O$ parameter, which is the ratio between the power of the direct path and that of the scattered path.

Figure 11:
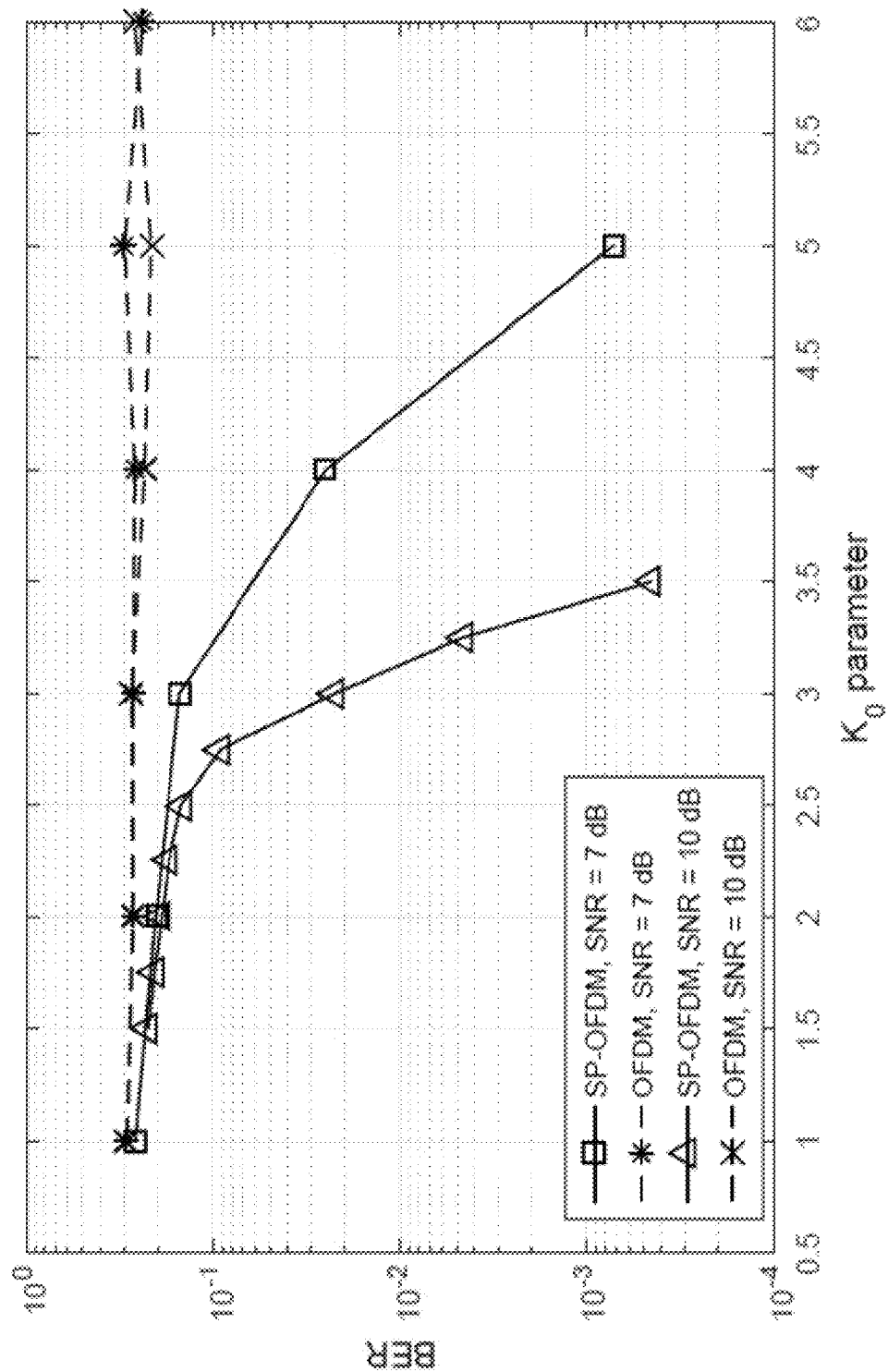
FIG. 11 is a graphical depiction showing BER performance comparison under disguised jamming in Rician channels.

FIG. 11 shows the BERs for LDPC code rate 1/3 under disguised jamming. Specifically, FIG. 11 shows BER performance comparison under disguised jamming in Rician channels where a code rate=1/3, SJR=0 dB. Here, the $K_O$ parameter refers to the power ratio between the direct path and the scattered path. It can be observed that the proposed system is still effective under the fading channel with a sufficient large $K_O$ parameter. For a small $K_O$ parameter, i.e., when the fading is severe, channel estimation and equalization will be needed to guarantee a reliable communication.

As described above, a highly secure and efficient OFDM system under disguised jamming is designed by exploiting secure symbol-level pre-coding based on phase randomization. The destructive effect of disguised jamming on the traditional OFDM system is examined and the robustness of SP-OFDM against disguised jamming in terms of synchronization and channel capacity is shown.

First, it is shown that a traditional OFDM cannot distinguish between the legitimate signal and disguised jamming in the synchronization process, while SP-OFDM, with the secure CP, can achieve accurate synchronization under disguised jamming.

Second, a channel capacity is analyzed of the traditional OFDM and the proposed SP-OFDM under hostile jamming using the arbitrarily varying channel (AVC) model. It was shown that the deterministic coding capacity of the traditional OFDM is zero under the worst disguised jamming. On the other hand, with the secure randomness shared between the authorized transmitter and receiver, the AVC channel corresponding to SP-OFDM is not symmetrizable, and hence, SP-OFDM can achieve a positive capacity under disguised jamming.

Both the theoretical and numerical results demonstrated that SP-OFDM is robust under disguised jamming and frequency selective fading. Therefore, SP-OFDM is a promising modulation scheme for high speed transmission under hostile environments, and the secure pre-coding scheme can also be applied to modulation techniques other than OFDM.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are the BLUETOOTH wireless networking standard from the Bluetooth Special Interest Group and IEEE Standard 802.15.4.

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

While various embodiments have been disclosed, it should be appreciated that additional variations of the OFDM system and method are also envisioned. For example, additional or different hardware components may be used although certain of the present advantages may not be fully realized. It is also noteworthy that any of the preceding features may be interchanged and intermixed with any of the others. Accordingly, any and/or all of the dependent claims may depend from all of their preceding claims and may be combined together in any combination. Variations are not to be regarded as a departure from the present disclosure, and all such modifications are entitled to be included within the scope and spirit of the present invention.

What is claimed is:

1. A securely pre-coded transceiver system comprising:
    a transmitter configured to transmit a secure transmit signal, including:
        a secure pre-coding device configured to receive an input data stream and apply a pre-coded phase shift to each data in the input data stream to generate a shifted symbol vector;
        a signal generation device configured to compute a transmit signal based on the shifted symbol vector; and
        a secure cyclic prefix device configured to apply a phase shift to a first portion of a cyclic prefix of the transmit signal to generate the secure transmit signal; and
    a receiver configured to receive the secure transmit signal, including:
        a synchronization device configured to estimate an offset of the received secure transmit signal to determine a shifted secure transmit signal;
        a signal recovering device configured to recover a transformed symbol vector from the shifted secure transmit signal; and
        a secure decoding device configured to obtain a symbol vector by applying a matrix to the transformed symbol vector.

2. The system of claim 1 wherein the receiver recovers the input data stream from the obtained symbol vector by mapping the obtained symbol vector to an estimated version of the input data stream.

3. The system of claim 1 wherein the secure pre-coding device includes a sequence generator to generate the pre-coded phase shift to apply to each data in the input data stream, wherein the pre-coded phase shift is random.

4. The system of claim 3 wherein the sequence generator is initialized using a global clock, and wherein the synchronization device is initialized using the global clock.

5. The system of claim 3 wherein the secure pre-coding device includes an encryption device configured to encrypt the pre-coded phase shift.

6. The system of claim 1 wherein the secure pre-coding device includes a mapping device configured to receive the input data stream and map the input data stream to a symbol vector, and wherein the pre-coded phase shift is applied to the symbol vector to generate the shifted symbol vector.

7. The system of claim 1 wherein the signal generation device computes an inverse fast Fourier transform of the shifted symbol vector to generate the transmit signal.

8. The system of claim 1 wherein the shifted symbol vector includes a plurality of data as subcarrier signals.

9. The system of claim 1 wherein the phase shift applied by the secure cyclic prefix device is encrypted.

10. The system of claim 1 wherein the synchronization device estimates the offset based on the first portion of the cyclic prefix of the received secure transmit signal and a second portion of the cyclic prefix of the received secure transmit signal.

11. The system of claim 1 wherein the synchronization device shifts the received secure transmit signal based on the offset to determine the shifted secure transmit signal.

12. The system of claim 1 wherein the signal recovering device applies a fast Fourier transform to the secure transmit signal to recover the transformed symbol vector.

13. The system of claim 1 wherein the input data stream is transmitted using orthogonal frequency division multiplexing (SP-OFDM).

14. A securely pre-coded orthogonal frequency division multiplexing (SP-OFDM) method comprising:
    obtaining, for transmission, an input data stream, wherein the input data stream inputs a plurality of data;
    applying a pre-coded phase shift to each data included in the input data stream to generate a shifted symbol vector;
    computing a transmit signal as an inverse fast Fourier transform of the shifted symbol vector;
    applying a secure phase shift to a first portion of a cyclic prefix of the transmit signal to generate a secure transmit signal; and transmitting the secure transmit signal to a receiver, wherein the receiver obtains the input data stream by:
receiving the secure transmit signal,
estimating an offset to apply to the received secure transmit signal, wherein the offset is based on the first portion of the cyclic prefix of the received secure transmit signal and a second portion of the cyclic prefix of the received secure transmit signal,
shifting the received secure transmit signal based on the offset,
recovering a transformed symbol vector by computing a fast Fourier transform of the shifted secure transmit signal, and
estimating the input data stream from a recovered symbol vector, wherein the recovered symbol vector is obtained by applying a matrix to the transformed symbol vector.

15. The method of claim 14 further comprising generating the pre-coded phase shift as a random phase shift to apply to each data in the input data stream.

16. The method of claim 15 wherein the pre-coded phase shift is generated using a global clock, and wherein the offset is estimated using the global clock.

17. The method of claim 15 further comprising encrypting the pre-coded phase shift.

18. The method of claim 14 wherein the pre-coded phase shift is applied to each symbol included in a symbol vector, and wherein each symbol included in the symbol vector is mapped from a corresponding data of the input data stream.

19. The method of claim 14 wherein the secure phase shift is encrypted.

20. A securely pre-coded orthogonal frequency division multiplexing (SP-OFDM) system comprising:

a transmitter configured to transmit a secure transmit signal, including:
a channel encoder configured to (i) receive an input data stream, (ii) add controlled redundancy, and (iii) generate a new data stream;
a mapper configured to receive the data stream and map the data stream to a symbol vector;
a secure pre-coder configured to receive the symbol vector and apply a random phase shift to each symbol of the symbol vector;
an inverse fast Fourier transform module configured to generate a body of an OFDM block using an inverse fast Fourier transform based on the shifted symbol vector; and
a secure cyclic prefix module configured to apply a phase shift to part of a cyclic prefix of the OFDM block to generate the secure transmit signal; and a receiver configured to receive the secure transmit signal, including:
a synchronization module configured to estimate an offset based on the cyclic prefix and an OFDM body tail of the OFDM block;
a demodulation module configured to remove the cyclic prefix by cropping the cyclic prefix to obtain the body of the OFDM block;
a fast Fourier transform module configured to apply a fast Fourier transform to the secure transmit signal to obtain a transformed symbol vector; and
a secure decoding module configured to obtain the symbol vector by applying a matrix to the transformed symbol vector.

* * * * *